US012778004B2

(12) United States Patent
Svensson et al.

(10) Patent No.: US 12,778,004 B2
(45) Date of Patent: Nov. 3, 2026

(54) CUTTING ARRANGEMENT AND LAWNMOWER

(71) Applicant: HUSQVARNA AB, Huskvarna (SE)

(72) Inventors: Mats Svensson, Huskvarna (SE); Rickard Bergh, Eksjo (SE)

(73) Assignee: HUSQVARNA AB, Huskvarna (SE)

( * ) Notice: Subject to any disclaimer, the term of this patent is extended or adjusted under 35 U.S.C. 154(b) by 372 days.

(21) Appl. No.: 18/554,905

(22) PCT Filed: Feb. 25, 2022

(86) PCT No.: PCT/SE2022/050199
§ 371 (c)(1),
(2) Date: Oct. 11, 2023

(87) PCT Pub. No.: WO2022/220713
PCT Pub. Date: Oct. 20, 2022

(65) Prior Publication Data

US 2024/0188491 A1 Jun. 13, 2024

(30) Foreign Application Priority Data

Apr. 14, 2021 (SE) .................................... 2150459-2

(51) Int. Cl.
*A01D 34/81* (2006.01)
*A01D 34/00* (2006.01)
(Continued)

(52) U.S. Cl.
CPC ........... *A01D 34/81* (2013.01); *A01D 34/008* (2013.01); *A01D 34/71* (2013.01); *A01D 34/73* (2013.01); *A01D 2101/00* (2013.01)

(58) Field of Classification Search
CPC ...... A01D 34/001; A01D 34/82; A01D 34/81; A01D 34/008; A01D 34/71; A01D 34/73;
(Continued)

(56) References Cited

U.S. PATENT DOCUMENTS 2,719,396 A 10/1955 Morris et al.
2,993,321 A 7/1961 Hester
(Continued)

FOREIGN PATENT DOCUMENTS

CA 2131411 A1 3/1995
EP 0766911 A1 4/1997
(Continued)

OTHER PUBLICATIONS

International Search Report and Written Opinion for International Application No. PCT/SE2022/050199 mailed May 23, 2022.
(Continued)

*Primary Examiner* — Brad Harcourt
(74) *Attorney, Agent, or Firm* — Burr & Forman

(57) ABSTRACT

A cutting arrangement (2) configured to be attached to a lawnmower (1) to cut vegetation is disclosed. The cutting arrangement (2) comprises a cutting unit (4) configured to rotate in a first rotational direction (R) around a rotation axis (Ax) during operation, a cutting guard (3) comprising a top surface (13) and side walls (34), and a centre body (8) protruding from the top surface (13). The centre body (8) is arranged such that the distance (d11, d12, d13) from the rotation axis (Ax) to radially outer delimiting surfaces (8.1, 8.2, 8.3) of the centre body (8) decreases continuously, seen in the first rotational direction (R), within a first angle (a1) having its vertex (v) at the rotation axis (Ax). The first angle (a1) exceeds 90 degrees or exceeds 180 degrees. The present disclosure further relates to a lawnmower (1) comprising a cutting arrangement (2).

21 Claims, 4 Drawing Sheets

(51) Int. Cl.

| | |
|---|---|
| ***A01D 34/71*** | (2006.01) |
| ***A01D 34/73*** | (2006.01) |
| ***A01D 101/00*** | (2006.01) |

(58) Field of Classification Search

CPC .. A01D 2101/00; A01D 34/00; A01D 34/412; A01D 34/52; A01D 34/63

See application file for complete search history.

(56) References Cited

U.S. PATENT DOCUMENTS

| | | | | | |
|---|---|---|---|---|---|
| 3,601,960 | A * | 8/1971 | Buechler | A01D 34/73 | 56/320.2 |
| 3,828,533 | A * | 8/1974 | Finneran | A01D 34/82 | 56/320.2 |
| 4,335,567 | A | 6/1982 | Comer | | |
| 4,407,112 | A | 10/1983 | Shepherd et al. | | |
| RE32,377 | E | 3/1987 | Seyerle | | |
| 4,711,077 | A | 12/1987 | Kutsukake et al. | | |
| 5,035,108 | A | 7/1991 | Meyer et al. | | |
| 7,555,887 | B2 * | 7/2009 | Schick | A01D 34/71 | 56/320.1 |
| 7,665,286 | B2 * | 2/2010 | Butler | A01D 34/005 | 56/320.1 |
| 2009/0178382 | A1 * | 7/2009 | Sugio | A01D 34/81 | 56/6 |
| 2016/0084436 | A1 * | 3/2016 | Gottinger | A01D 34/008 | 307/328 |
| 2017/0367259 | A1 | 12/2017 | Shaffer et al. | | |

FOREIGN PATENT DOCUMENTS

| | | | |
|---|---|---|---|
| GB | 637832 | A | 5/1950 |
| JP | 2007300897 | A | 11/2007 |
| JP | 5912305 | B2 | 4/2016 |
| JP | 6313348 | B2 | 4/2018 |
| JP | 2018102250 | A | 7/2018 |
| SE | 442807 | B | 2/1986 |
| WO | 8103106 | A1 | 11/1981 |
| WO | 9965289 | A1 | 12/1999 |
| WO | 2018036829 | A1 | 3/2018 |
| WO | 2020011524 | A1 | 1/2020 |

OTHER PUBLICATIONS

Search Report and Office Action for Swedish Application No. 2150459-2 mailed Nov. 3, 2021.

International Search Report and Written Opinion for International Application No. PCT/SE2022/050198 mailed May 19, 2022.

Search Report and Office Action for Swedish Application No. 2150458-4 mailed Oct. 29, 2021.

* cited by examiner

CUTTING ARRANGEMENT AND LAWNMOWER

TECHNICAL FIELD

The present disclosure relates to a cutting arrangement configured to be attached to a lawnmower to cut vegetation. The present disclosure further relates to a lawnmower comprising a cutting arrangement.

BACKGROUND

A lawnmower is an apparatus capable of cutting grass of a lawn. Various types of lawnmowers exist on today's market. Examples are walk-behind mowers and self-propelled robotic lawnmowers. A walk-behind mower is a lawnmower usually comprising an elongated handle allowing a user to push, and/or to guide, the lawnmower. Some walk-behind mowers comprise a propulsion arrangement configured to drive one or more wheels of the lawnmower. Walk-behind mowers lacking a propulsion arrangement are sometimes referred to as "push mowers". Some lawnmowers comprise a power unit in the form of an electric motor configured to rotate the cutting unit and some lawnmowers comprise a power unit in the form of a combustion engine configured to rotate the cutting unit.

A self-propelled robotic lawnmower is a mower capable of cutting grass in areas in an autonomous manner. Some robotic lawnmowers require a user to set up a border wire around a lawn that defines the area to be mowed. Such robotic lawnmowers use a sensor to locate the wire and thereby the boundary of the area to be trimmed. In addition to the wire, robotic lawnmowers may also comprise other types of positioning units and sensors, for example sensors for detecting an event, such as a collision with an object within the area. The robotic lawnmower may move in a systematic and/or random pattern to ensure that the area is completely cut. A robotic lawnmower usually comprises one or more batteries and one or more electrically driven cutting units being powered by the one or more batteries. In some cases, the robotic lawnmower uses the wire to locate a recharging dock used to recharge the one or more batteries. Generally, robotic lawnmowers operate unattended within the area in which they operate. Examples of such areas are lawns, gardens, parks, sports fields, golf courts and the like.

Lawnmowers of various type are associated with some mutual problems. One such problem is energy consumption of the lawnmower. That is, cutting grass usually requires a lot of energy. Due to environmental concerns, it is a great advantage if lawnmowers and associated arrangements and systems can be arranged to operate in an energy efficient manner. Moreover, after a certain time of operation, an energy storage unit of a lawnmower, such as a battery or fuel tank, has to be charged or refilled. Thus, by reducing the energy consumption of the lawnmower, more available operational time of the lawnmower can be obtained given a certain energy storing capacity of the energy storage unit of the lawnmower. Furthermore, a more cost-efficient lawnmower can be provided because the consumption of fuel or electricity incurs costs.

Another such problem is the cutting result, which can be subdivided into visual cutting result and uniformity of cutting. The visual cutting result can be defined as the visual cutting result determined by a person viewing a mowed lawn. The uniformity of the cutting can be defined as uniformity of a length of the grass of a mowed lawn, i.e. if straws of the grass in a lawn are cut to a uniform length.

Most lawnmowers comprise a cutting arrangement comprising a cutting guard and a cutting unit, wherein the cutting unit is configured to rotate inside the cutting guard during operation. Cutting guards are used to increase safety during operation of a lawnmower and during handling of the lawnmower.

A common problem for lawnmowers is that traces may be formed in the lawn having shorter or longer length of grass. Such traces significantly reduce the visual appearance of the lawn. One aspect that reduces the cutting result is that grass tend to bend when a cutting arrangement is moved over the lawn. The grass may then become straighter again which causes an uneven cutting result and impair the visual appearance of the lawn.

One way to improve the cutting result is to ensure that the grass is lifted towards the cutting unit when cutting unit is moved over the lawn. This can be performed by arranging the cutting unit with one or more surfaces being angled relative to a rotation plane of the cutting unit. In this manner, a negative pressure can be generated inside the cutting guard which lifts grass towards the cutting unit. This method is highly efficient when it comes to cutting result and visual appearance of a lawn after cutting. However, this method is also highly energy consuming. This because the energy needed for creating the negative pressure inside the cutting guard increases the rotational resistance of the cutting unit and hence the energy consumption of the cutting arrangement. Another aspect is that the attack angle of the angled surfaces not only generates a negative pressure inside the cutting guard but also some air flow in unwanted directions which adds to the increase in rotational resistance of the cutting unit and hence the energy consumption of the cutting arrangement.

Another problem associated with lawnmowers is decomposition of grass clippings. That is, grass cut by the lawnmower takes time to decompose, and such grass clippings may have a negative impact on the visual cutting result because grass clippings may accumulate to form strings or clumps on the lawn. Apart from having a negative impact on the visual cutting result, accumulated grass clippings may disturb and annoy users of the lawn.

Furthermore, generally, on today's consumer market, it is an advantage if products, such as lawnmowers and associated components, systems, and arrangements, have conditions and/or characteristics suitable for being manufactured and assembled in a cost-efficient manner.

SUMMARY

It is an object of the present invention to overcome, or at least alleviate, at least some of the above-mentioned problems and drawbacks.

According to a first aspect of the invention, the object is achieved by a cutting arrangement configured to be attached to a lawnmower to cut vegetation. The cutting arrangement comprises a cutting unit configured to rotate in a first rotational direction around a rotation axis during operation, a cutting guard comprising a top surface and side walls, and a centre body protruding from the top surface. The centre body is arranged such that the distance from the rotation axis to radially outer delimiting surfaces of the centre body decreases continuously, seen in the first rotational direction, within a first angle having its vertex at the rotation axis, wherein the first angle exceeds 90 degrees, or exceeds 180 degrees.

Since the cutting arrangement comprises a centre body protruding from the top surface arranged such that the distance from the rotation axis to radially outer delimiting surfaces of the centre body decreases continuously in a large proportion of the cutting guard, a cutting arrangement is provided having conditions for generating airflow and a negative pressure inside the cutting guard in an energy efficient manner to lift grass towards the cutting unit.

This is because the decreasing radius of the centre body in the rotational direction of the cutting unit can improve the generation of airflow and the generation of negative pressure inside the cutting guard while reducing the rotational resistance of the cutting unit and hence the energy consumption of the cutting unit.

In addition, since the cutting arrangement provides conditions for a more efficient generation of airflow and generation of negative pressure inside the cutting guard, a cutting arrangement is provided having conditions for an improved cutting result.

Thus, due to the features of the cutting arrangement, the energy consumption of a lawnmower comprising the cutting arrangement can be lowered and the cutting result can be improved. In addition, the cutting arrangement provides conditions for increasing available operational time of a lawnmower comprising the cutting arrangement before an energy storing unit of the lawnmower has to be charged or refilled. As a further result thereof, the cutting arrangement provides conditions for operating a lawnmower comprising the cutting arrangement in a more cost-efficient manner.

Accordingly, a cutting arrangement is provided overcoming, or at least alleviating, at least some of the above-mentioned problems and drawbacks. As a result, the above-mentioned object is achieved.

Optionally, the distance from the rotation axis to a radially outer delimiting surface of the centre body at a first side of the first angle is at least 15% greater, or at least 35% greater, than the distance from the rotation axis to a radially outer delimiting surface of the centre body at a second side of the first angle. Thereby, it can be ensured that the cutting arrangement can generate airflow and a negative pressure inside the cutting guard in an energy efficient manner to efficiently lift grass towards the cutting unit.

Optionally, the distance from the rotation axis to radially outer delimiting surfaces of the centre body decreases with a substantially constant rate within at least a portion of the first angle. Thereby, efficient aerodynamic properties can be provided inside the cutting guard. In this manner, it can be ensured that an airflow and a negative pressure inside the cutting guard can be generated in an efficient manner to lower the energy consumption of the cutting arrangement and improve the cutting result thereof.

Optionally, the centre body is arranged such that the largest distance from the rotation axis to a radially outer delimiting surface of the centre body is at least 30% greater, or at least 40% greater, than the smallest distance from the rotation axis to a radially outer delimiting surface of the centre body. Thereby, it can be ensured that the cutting arrangement can generate airflow and a negative pressure inside the cutting guard in an energy efficient manner to efficiently lift grass towards the cutting unit.

Optionally, the volume of a space delimited by radially inner delimiting surfaces of the side walls and radially outer delimiting surfaces of the centre body increases continuously within the first angle seen in the first rotational direction. Thereby, further efficient aerodynamic properties can be provided inside the cutting guard. In this manner, it can be ensured that an airflow and a negative pressure inside the cutting guard can be generated in an efficient manner to lower the energy consumption of the cutting arrangement and improve the cutting result thereof.

Optionally, the cutting guard is arranged such that the distance between the radially outer delimiting surfaces of the centre body and radially inner delimiting surfaces of the side walls increases continuously within the first angle seen in the first rotational direction. Thereby, it can be further ensured that the cutting arrangement can generate airflow and a negative pressure inside the cutting guard in an energy efficient manner to efficiently lift grass towards the cutting unit.

Optionally, the cutting guard is arranged such that the distance from the rotation axis to radially inner delimiting surfaces of the side walls increases continuously within the first angle seen in the first rotational direction. Thereby, even further efficient aerodynamic properties can be provided inside the cutting guard. In this manner, it can be ensured that an airflow and a negative pressure inside the cutting guard can be generated in an efficient manner to lower the energy consumption of the cutting arrangement and improve the cutting result thereof.

Optionally, the cutting guard comprises a discharge opening arranged to eject clippings in a main discharge direction from the cutting guard. Thereby, a cutting arrangement is provided having conditions for distributing clippings in an efficient manner to avoid the formation of accumulated clipping in strings or clumps on a lawn being operated. In addition, a cutting arrangement is provided having conditions for avoiding accumulation of clippings inside the cutting guard which can reduce the need for removal of such clippings. As a further result thereof, a more reliable cutting arrangement is provided. In addition, due to the discharge opening, even further efficient aerodynamic properties can be provided inside the cutting guard to generate an airflow in an even more efficient manner to lower the energy consumption of the cutting arrangement and improve the cutting result thereof.

Optionally, the cutting arrangement is configured to be attached to the lawnmower such that a forward direction of the cutting arrangement coincides with a forward direction of the lawnmower, and wherein the main discharge direction is transversal to the forward direction of the cutting arrangement. Thereby, a cutting arrangement is provided having conditions for distributing clippings in an efficient manner to avoid the formation of accumulated clipping in strings or clumps on a lawn being operated.

Optionally, the angle between the main discharge direction and the forward direction of the cutting arrangement is within the range of 30-170 degrees or is within the range of 70-150 degrees. Thereby, a cutting arrangement is provided having conditions for distributing clippings in an efficient manner to avoid the formation of accumulated clipping in strings or clumps on a lawn being operated.

Optionally, the cutting arrangement comprises a delimiting wall extending between the centre body and the side walls of the cutting guard, and wherein the delimiting wall forms a delimiting surface of an outlet portion of the discharge opening. Thereby, it can be ensured that clippings are discharged from the cutting guard instead of circulating inside the cutting guard around the rotation axis of the cutting unit. In addition, it can be ensured that a negative pressure can be generated inside the cutting guard in an efficient manner to lift grass towards the cutting unit.

Optionally, the centre body is arranged such that the distance from the rotation axis to radially outer delimiting surfaces of the centre body increases, seen in the first rotational direction, within a second angle having its vertex at the rotation axis. Thereby, conditions are provided for generating airflow and a negative pressure inside the cutting guard in an efficient manner, while ensuring that clippings can be discharged from the cutting guard in an efficient manner.

Optionally, the volume of a space delimited by radially inner delimiting surfaces of the side walls and the radially outer delimiting surfaces of the centre body increases within the second angle seen in the first rotational direction. Thereby, conditions are provided for generating airflow and a negative pressure inside the cutting guard in a further efficient manner, while ensuring that clippings can be discharged from the cutting guard in an efficient manner.

Optionally, a second side of the first angle constitutes a first side of the second angle. Thereby, further efficient aerodynamic properties can be provided inside the cutting guard. This is because a smooth transition is provided between the area of the centre body in which the distance from the rotation axis to radially outer delimiting surfaces of the centre body decreases and the area of the centre body in which the distance from the rotation axis to radially outer delimiting surfaces of the centre body increases.

Optionally, the sum of the first and second angles is within the range of 320-360 degrees. Thereby, conditions are provided for generating airflow and a negative pressure inside the cutting guard in an efficient manner, while ensuring that clippings can be discharged from the cutting guard in an efficient manner.

Optionally, a tangential moving direction of the cutting unit, upon rotation of the cutting unit in the first rotational direction, coincides with the main discharge direction at a location within the second angle. Thereby, conditions are provided for an efficient discharge of clippings from the cutting guard.

Optionally, the cutting arrangement is configured to be attached to the lawnmower such that a forward direction of the cutting arrangement coincides with a forward direction of the lawnmower, and wherein an angle between the forward direction of the cutting arrangement and a second side of the first angle is less than 40 degrees or is less than 20 degrees.

Optionally, the radially outer delimiting surfaces of the centre body extends in directions substantially parallel to the rotation axis. Thereby, conditions are provided for generating a negative pressure inside the cutting guard in an efficient manner to lower the energy consumption of the cutting arrangement and improve the cutting result.

Optionally, the radially inner delimiting surfaces of the side walls extend in directions substantially parallel to the rotation axis. Thereby, conditions are provided for generating a negative pressure inside the cutting guard in an efficient manner to lower the energy consumption of the cutting arrangement and improve the cutting result.

Optionally, the height of the radially outer delimiting surfaces of the centre body is at least 20%, or is at least 50%, of the height of the radially inner delimiting surfaces of the side walls. Thereby, conditions are provided for generating an airflow and a negative pressure inside the cutting guard in an efficient manner to lower the energy consumption of the cutting arrangement and improve the cutting result.

Optionally, the cutting unit comprises one or more surfaces being angled relative to a rotation plane of the cutting unit to generate an airflow in a direction transverse to the rotation plane during rotation of the cutting unit in the first rotational direction. Thereby, a cutting arrangement is provided having conditions for generating airflow and a negative pressure inside the cutting guard in an energy efficient manner to lift grass towards the cutting unit. Moreover, due to the form of the centre body providing conditions for generating airflow and negative pressure in an efficient manner, the need for using large angles of the surfaces is reduced. In this manner, a low rotational resistance of the cutting unit can be provided to lower the energy consumption of the cutting unit and improving the cutting result.

Optionally, the surfaces are angled relative to the rotation plane to generate an airflow in a direction towards the top surface of the cutting guard during rotation of the cutting unit in the first rotational direction. Thereby, an airflow is generated in a direction from the ground surface towards the top surface of the cutting guard during operation of the cutting arrangement to efficiently lift grass towards the cutting unit.

Optionally, the cutting unit comprises a number of sharp cutting edges, and wherein each surface of the one or more surfaces is/are separate from the number of sharp leading edges. Thereby, an effective airflow and an effective generation of negative pressure inside the cutting guard can be ensured, while ensuring a satisfactory cutting result.

Optionally, the one or more surfaces is/are angled relative to the rotation plane with an angle within the range of 12-38 degrees, or within the range of 17-23 degrees. Thereby, due to the relatively small angle between the one or more surfaces and the rotation plane, a low rotational resistance of the cutting unit and hence a low energy consumption of the cutting unit is provided. Moreover, due to the relatively small angle between the one or more surfaces and the rotation plane, air flow in unwanted directions is reduced which in turn reduces the rotational resistance of the cutting unit and hence the energy consumption of the cutting arrangement. Accordingly, due to the relatively small angle between the one or more surfaces and the rotation plane, a negative pressure inside the cutting guard can be generated in an efficient manner.

Optionally, the cutting unit comprises at least a first and a second surface each being angled relative to the rotation plane of the cutting unit to generate an airflow in a direction transverse to the rotation plane during operation of the cutting arrangement, wherein the second surface is arranged behind the first surface along a tangential direction of the cutting unit, and wherein the first surface is angled at a fourth angle relative to the rotation plane and the second surface is angled at a fifth angle relative to the rotation plane, and wherein the fifth angle is greater than the fourth angle. Thereby, efficient aerodynamic properties of the cutting unit can be provided to efficiently generate a negative pressure inside the cutting guard while avoiding a high rotational resistance of the cutting unit. Accordingly, due to these features, an even more energy efficient cutting arrangement can be provided.

Optionally, the second surface is arranged behind the first surface seen along a moving direction of the surfaces upon rotation of the cutting unit in the first rotational direction. Thereby, efficient aerodynamic properties of the cutting unit can be provided to efficiently generate a negative pressure inside the cutting guard while avoiding a high rotational resistance of the cutting unit. Accordingly, due to these features, an even more efficient cutting arrangement can be provided.

Optionally, the cutting unit comprises a first section comprising the first surface, and wherein the first section comprises a sharp leading edge arranged adjacent to the first surface. Thereby, a cutting unit is provided capable of efficiently generating a negative pressure inside the cutting guard while providing conditions for obtaining a satisfactory cutting result.

Optionally, the fourth angle is within the range of 1-12 degrees or is within the range of 2-7 degrees, and wherein the fifth angle is within the range of 12-38 degrees, or within the range of 17-23 degrees. Thereby, efficient aerodynamic properties of the cutting unit can be ensured to efficiently generate a negative pressure inside the cutting guard while avoiding high rotational resistance of the cutting unit. Accordingly, due to these features, an even more efficient cutting arrangement can be provided.

Optionally, each of the first and second surfaces is substantially planar. Thereby, a cutting arrangement is provided capable of efficiently generating a negative pressure inside the cutting guard and capable of cutting vegetation in an efficient manner while having conditions and characteristics suitable for being manufactured in a cost-efficient manner.

Optionally, the cutting unit comprises a hub and a number of cutting members pivotally attached at a periphery of the hub. Thereby, a safer and more durable cutting arrangement is provided because a cutting member may pivot upon impact with an object, such as a stone, a stump, or a limb of a person or animal.

Optionally, the one or more surfaces is/are surfaces of the cutting members. Thereby, a safer and more durable cutting arrangement is provided having conditions for efficiently generating a negative pressure inside the cutting guard.

Optionally, the hub is disc-shaped. Thereby, an even safer and more operational reliable cutting arrangement is provided. This is because a disc-shaped hub is considerably less likely to become stuck upon impact with an object, such as a stone, a stump, or a limb of a person or animal, as compared to a hub having another type of shape.

Optionally, the cutting unit comprising at least two cutting members arranged at different distances from a rotation axis of the cutting unit. Thereby, a cutting arrangement is provided having conditions for cutting vegetation in a further efficient manner. This is because the at least two cutting members will cut vegetation at different radiuses from the rotation axis of the cutting unit. According to these embodiments, the radially outer portion/portions of the cutting unit which orbits in the circular path inside the cutting guard is/are portion/portions of a cutting member arranged furthest from the rotation axis.

Optionally, each cutting member comprises a first and a second section comprising a first and a second surface respectively, wherein each of the first and a second surfaces is angled relative to the rotation plane of the cutting unit to generate an airflow in a direction transverse to the rotation plane during operation of the cutting arrangement, and wherein each cutting member further comprises an attachment section pivotally attached to a hub of the cutting unit, and a connecting section connecting the first section to the attachment section. Thereby, a cutting arrangement is provided capable efficiently generating a negative pressure inside the cutting guard and capable of cutting vegetation in an efficient manner while having conditions and characteristics suitable for being manufactured in a cost-efficient manner.

Optionally, the attachment section is parallel to the rotation plane. Thereby, a cutting arrangement is provided capable of efficiently generating a negative pressure inside the cutting guard and capable of cutting vegetation in an efficient manner while having conditions and characteristics suitable for being manufactured and assembled in a cost-efficient manner.

Optionally, the connecting section is angled relative to the rotation plane and relative to a radial direction of the cutting unit. Thereby, a cutting arrangement is provided having conditions for cutting vegetation in a further efficient manner.

Optionally, the first section, the second section, the attachment section, and the connecting section are formed by bending of one piece of a sheet material. Thereby, a cutting arrangement is provided capable of efficiently generating a negative pressure inside the cutting guard and capable of cutting vegetation in an efficient manner while having conditions and characteristics suitable for being manufactured and assembled in a cost-efficient manner.

Optionally, each of the first section, the second section, the attachment section, and the connecting section is substantially planar. Thereby, a cutting arrangement is provided capable efficiently generating a negative pressure inside the cutting guard and capable of cutting vegetation in an efficient manner while having conditions and characteristics suitable for being manufactured and assembled in a cost-efficient manner.

Optionally, the cutting unit is configured to rotate such that one or more radially outer portions of the cutting unit orbits in a circular path inside the cutting guard, and wherein a first radial distance from the circular path to a radially inner delimiting surface of the front section of the cutting guard is greater than a second radial distance from the circular path to a radially inner delimiting surfaces of the rear section of the cutting guard.

Since the first radial distance from the circular path to the inner surface of the front section of the cutting guard is greater than the second radial distance, a cutting arrangement is provided having conditions for cutting grass in an energy efficient manner while having conditions for obtaining an improved cutting result. The cutting result can be improved because grass is allowed to raise to an upright straight position by its own stiffness after having been bent by the front section of the cutting guard during movement of the cutting guard in the forward direction over a lawn.

That is, studies have shown that the bending of the grass caused by the front section of a cutting guard impairs the cutting result because a large proportion of the grass do not have time to raise to an upright straight position by its own stiffness to reach the cutting unit. However, due to the greater distance from the front section of the cutting guard to radially outer portions of the cutting unit, at least a larger proportion of the grass will have time to raise to an upright straight position by its own stiffness after having been bent by the front section of the cutting guard. Thereby, conditions are provided for an improved cutting result.

Moreover, the need for forming a large negative pressure inside the cutting guard is circumvented, or at least reduced, which provides conditions for operating the cutting arrangement in an energy efficient manner. In addition, the greater distance from the front section of the cutting guard to the circular path can reduce the negative pressure inside the cutting guard which in turn can reduce the rotational resistance of the cutting unit and hence the energy consumption of the cutting unit.

Thus, due to the features of the cutting arrangement, the energy consumption of a lawnmower comprising the cutting arrangement can be lowered and the cutting result can be improved. In addition, the cutting arrangement provides conditions for increasing available operational time of a lawnmower comprising the cutting arrangement before an energy storing unit of the lawnmower has to be charged or refilled. As a further result thereof, the cutting arrangement provides conditions for operating a lawnmower comprising the cutting arrangement in a more cost-efficient manner.

Optionally, the first radial distance is within the range of 150%-1300% of the second radial distance or is within the range of 350%-900% of the second radial distance. Thereby, it can be further ensured that at least a great proportion of the grass will have time to raise to an upright straight position by its own stiffness after having been bent by the front section of the cutting guard which improves the cutting result and provides conditions for an energy efficient cutting arrangement.

According to a second aspect of the invention, the object is achieved by a lawnmower comprising a cutting arrangement according to some embodiments of the present disclosure.

Thereby, a lawnmower is provided having conditions for cutting grass in an energy efficient manner while having conditions for obtaining an improved cutting result. This is because the cutting arrangement of the lawnmower has conditions for generating airflow and a negative pressure inside the cutting guard in an energy efficient manner to lift grass towards the cutting unit.

Thus, due to the features of the cutting arrangement of the lawnmower, the energy consumption of the lawnmower can be lowered, and the cutting result can be improved. As a further result thereof, a lawnmower is provided having conditions for more available operational time before an energy storing unit of the lawnmower has to be charged or refilled. In addition, a more cost-efficient lawnmower is provided.

Accordingly, a lawnmower is provided overcoming, or at least alleviating, at least some of the above-mentioned problems and drawbacks. As a result, the above-mentioned object is achieved.

Optionally, the lawnmower is a self-propelled robotic lawnmower configured to navigate and cut grass in an area in an autonomous manner. Thereby, a self-propelled robotic lawnmower is provided having conditions for cutting grass in an energy efficient manner while having conditions for obtaining an improved cutting result. This is because the cutting arrangement of the self-propelled robotic lawnmower has conditions for generating airflow and a negative pressure inside the cutting guard in an energy efficient manner to lift grass towards the cutting unit.

Thus, due to the features of the cutting arrangement of the self-propelled robotic lawnmower, the energy consumption of the self-propelled robotic lawnmower can be lowered, and the cutting result can be improved. As a further result thereof, a self-propelled robotic lawnmower is provided having conditions for more available operational time. In addition, a more cost-efficient self-propelled robotic lawnmower is provided.

Optionally, the lawnmower comprises a motor configured to rotate the cutting unit during operation of the lawnmower at a rotational speed causing the one or more radially outer portions of the cutting unit to orbit at a velocity within the range of 60-80 metres per second, or within the range of 65-75 metres per second. Thereby, a low energy consumption of the cutting unit can be ensured while obtaining a satisfactory cutting result.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
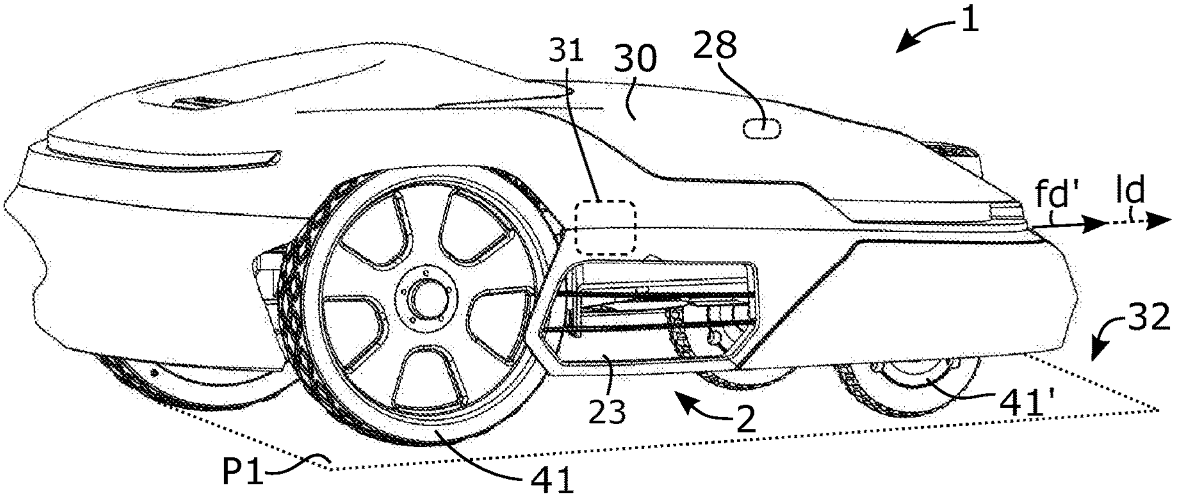
FIG. 1 illustrates a perspective view of a lawnmower according to some embodiments.

FIG. 1 illustrates a perspective view of a lawnmower 1 according to some embodiments of the present disclosure. According to the illustrated embodiments, the lawnmower 1 is a self-propelled autonomous robotic lawnmower, i.e. a lawnmower 1 capable of navigating and operating an area in an autonomous manner in an area without the intervention or the direct control of a user. For reasons of brevity and clarity, the self-propelled autonomous robotic lawnmower 1 is in some places herein referred to as "the robotic lawnmower 1" or simply "the lawnmower 1". According to further embodiments, the lawnmower 1 may be another type of lawnmower, such as a walk-behind mower or a push mower. According to the embodiments herein, the lawnmower 1 is a small or mid-sized lawnmower 1 configured to be used to cut grass in areas used for aesthetic and recreational purposes, such as gardens, parks, city parks, sports fields, lawns around houses, apartments, commercial buildings, offices, and the like.

The lawnmower 1 comprises a lawnmower body 30 and a number of lawnmower support members 41, 41' each configured to abut against a ground surface 32 in a first plane P1 during operation of the lawnmower 1 to support the lawnmower body 30. The lawnmower body 30, as referred to herein, may also be referred to as a lawnmower chassis. Accordingly, the first plane P1 will extend along a ground surface 32 when the lawnmower 1 is positioned on a flat ground surface 32 in an intended use position thereon as is illustrated in FIG. 1.

According to the illustrated embodiments, the lawnmower support members 41, 41' is wheels 41, 41' of the lawnmower 1. According to the illustrated embodiments, the lawnmower 1 comprises four wheels 41, 41', namely two drive wheels 41 and two support wheels 41'. The drive wheels 41 of the lawnmower 1 may each be powered by an electrical motor of the lawnmower 1 to provide motive power and/or steering of the lawnmower 1.

In FIG. 1, a longitudinal direction ld of the lawnmower 1 is indicated. The longitudinal direction ld of the lawnmower 1 extends in a longitudinal plane of the lawnmower 1. The longitudinal plane is parallel to the first plane P1. The longitudinal direction ld of the lawnmower 1 is thus parallel to the first plane P1 and thus also to a ground surface 32 when the lawnmower 1 is positioned onto a flat ground surface 32 in an intended use position. Moreover, the longitudinal direction ld of the lawnmower 1 is parallel to a forward direction fd' of the lawnmower 1 as well as a reverse direction of the lawnmower 1. The reverse direction is opposite to the forward direction fd'. The forward direction fd' of the lawnmower 1 may also be referred to as a forward moving direction fd' of the lawnmower 1. Likewise, the reverse direction of the lawnmower 1 may also be referred to as a reverse moving direction of the lawnmower 1

According to the illustrated embodiments, the drive wheels 41 of the lawnmower 1 are non-steered wheels having a fix rolling direction in relation to the lawnmower body 30. The respective rolling direction of the drive wheels 41 of the lawnmower 1 is substantially parallel to the longitudinal direction ld of the lawnmower 1. According to the illustrated embodiments, the support wheels 41' are non-driven wheels. Moreover, according to the illustrated embodiments, the support wheels 41' can pivot around a respective pivot axis such that the rolling direction of the respective support wheel 41' can follow a travel direction of the lawnmower 1.

As understood from the above, when the drive wheels 41, 41' of the lawnmower 1 are rotated at the same rotational velocity in a forward rotational direction, and no wheel slip is occurring, the lawnmower 1 will move in the forward direction fd' indicated in FIG. 1. Likewise, when the drive wheels 41, 41' of the lawnmower 1 are rotated at the same rotational velocity in a reverse rotational direction, and no wheel slip is occurring, the lawnmower 1 will move in the reverse direction.

According to the illustrated embodiments, the lawnmower 1 may be referred to as a four-wheeled rear wheel driven lawnmower 1. According to further embodiments, the lawnmower 1 may be provided with another number of wheels 41, 41', such as three wheels. Moreover, according to further embodiments, the lawnmower 1 may be provided with another configuration of driven and non-driven wheels, such as a front wheel drive or an all-wheel drive.

According to the illustrated embodiments, the lawnmower 1 comprises a control arrangement 28. The control arrangement 28 may be configured to control propulsion of the lawnmower 1, and steer the lawnmower 1, by controlling electrical motors of the lawnmower 1 arranged to drive the drive wheels 41 of the lawnmower 1. According to further embodiments, the control arrangement 28 may be configured to steer the lawnmower 1 by controlling the angle of steered wheels of the lawnmower 1. According to still further embodiments, the robotic lawnmower may be an articulated robotic lawnmower, wherein the control arrangement 28 may be configured to steer the robotic lawnmower by controlling the angle between frame portions of the articulated robotic lawnmower.

The control arrangement 28 may be configured to control propulsion of the lawnmower 1 and may be configured to steer the lawnmower 1 so as to navigate the lawnmower 1 in an area to be operated. The lawnmower 1 may further comprise one or more sensors arranged to sense a magnetic field of a wire, and/or one or more positioning units, and/or one or more sensors arranged to detect an impending or ongoing collision event with an object. In addition, the lawnmower 1 may comprise a communication unit connected to the control arrangement 28. The communication unit may be configured to communicate with a remote communication unit to receive instructions therefrom and/or to send information thereto. The communication may be performed wirelessly over a wireless connection such as the internet, or a wireless local area network (WLAN), or a cellular network, or a wireless connection for exchanging data over short distances using short-wavelength, i.e. ultra-high frequency (UHF) radio waves in the industrial, scientific, and medical (ISM) band from 2.4 to 2.486 GHz.

The control arrangement 28 may be configured to control propulsion of the lawnmower 1, and steer the lawnmower 1, so as to navigate the lawnmower 1 in a systematic and/or random pattern to ensure that an area is completely covered, using input from one or more of the above described sensors and/or units. Furthermore, the lawnmower 1 may comprise one or more batteries arranged to supply electricity to components of the lawnmower 1. As an example, the one or more batteries may be arranged to supply electricity to electrical motors of the lawnmower 1, such as one or more electric propulsion motors, by an amount controlled by the control arrangement 28. The lawnmower 1 comprises a cutting arrangement 2. The cutting arrangement 2 is configured to cut vegetation, such as leaves, as is further explained herein.

In FIG. 1, a motor 31 of the lawnmower 1 is schematically indicated. The motor 31 is configured to rotate a cutting unit of the cutting arrangement 2 during operation of the lawnmower 1. According to the illustrated embodiments, the motor 31 is an electric motor. According to further embodiments, the motor 31 may be another type of motor for rotating the cutting unit 4, such as an internal combustion engine. According to the illustrated embodiments, one or more batteries of the lawnmower 1 may be arranged to supply electricity to the motor 31.

Figure 2:
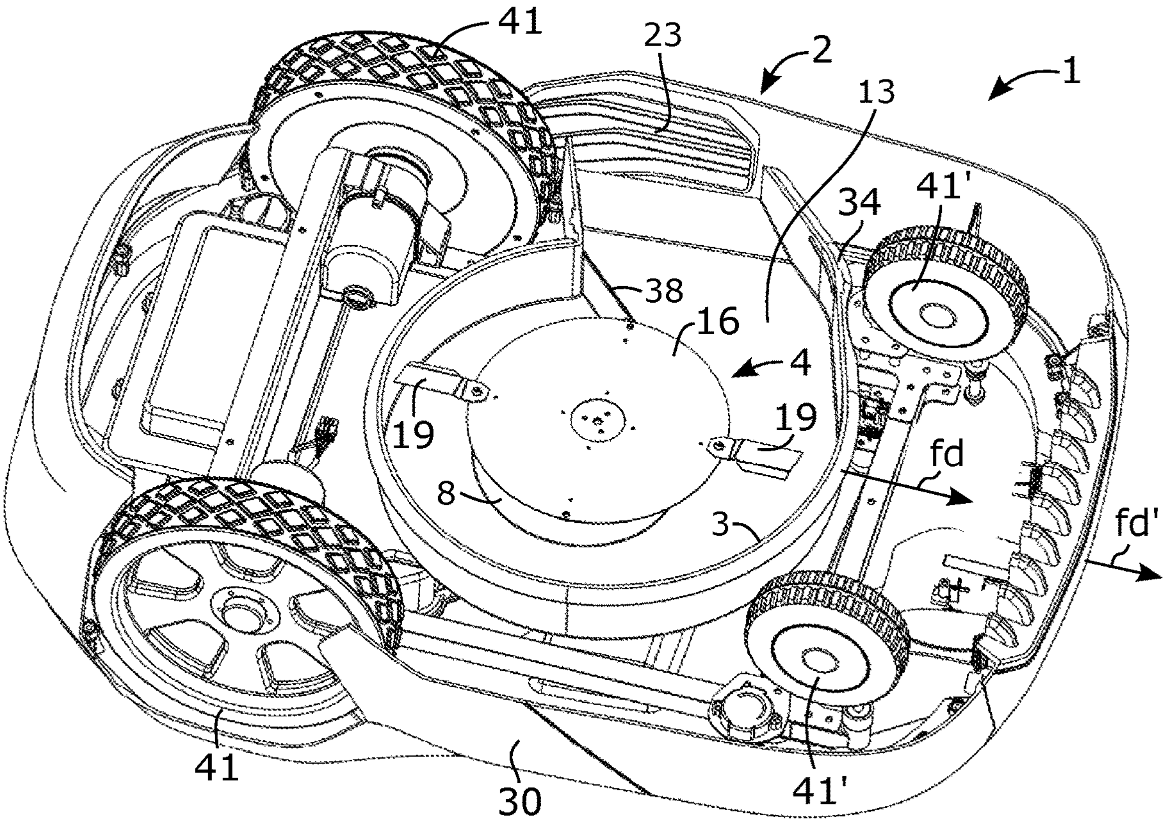
FIG. 2 illustrates a perspective view of an underside of the lawnmower illustrated in FIG. 1.

FIG. 2 illustrates a perspective view of an underside of the lawnmower 1 illustrated in FIG. 1. As indicated in FIG. 2, the cutting arrangement 2 comprises a cutting guard 3 and a cutting unit 4. The cutting arrangement 2 is configured to be attached to a lawnmower 1 to cut vegetation, such as grass. The cutting arrangement 2 is configured to be attached to the lawnmower 1 such that a forward direction fd of the cutting arrangement 2 coincides with the forward direction fd' of the lawnmower 1. Accordingly, the cutting guard 3 is configured to be attached to the lawnmower body 30 in a predetermined orientation relative to the lawnmower body 30. The cutting arrangement 2 may be attached to the lawnmower 1 using one or more fastening elements, one or more snap-fit arrangements, or the like. The cutting unit 4 may be attached to a drive shaft of the lawnmower 1, which drive shaft is configured to rotate the cutting unit 4 when the lawnmower 1 is used for cutting grass. The cutting unit 4 may be attached to the drive shaft via a splined connection, or the like.

According to the embodiments illustrated in FIG. 2, the cutting unit 4 comprises a hub 16 and a number of cutting members 19 pivotally attached at a periphery of the hub 16. Moreover, according to these embodiments, the hub 16 is disc-shaped. According to further embodiments, the cutting unit 4 may be differently arranged and may have a different layout, as is further explained herein.

The cutting guard 3 comprises a top surface 13 and side walls 34. The top surface 13 of the cutting guard 3 faces the first plane P1 indicated in FIG. 1 and thus also faces a ground surface 32 when the lawnmower 1 is positioned onto a flat ground surface 32 in an intended use position. Moreover, according to the illustrated embodiments, the top surface 13 of the cutting guard 3 is substantially parallel to the first plane P1 indicated in FIG. 1, and thus also to a ground surface 32, when the lawnmower 1 is positioned onto a flat ground surface 32 in an intended use position. The side walls 34 enclose at least a portion of the cutting unit 4. According to the illustrated embodiments, the side walls 34 are substantially perpendicular to the top surface 13 of the cutting guard 3. That is, according to the illustrated embodiments, the side walls 34 extend in directions substantially perpendicular to the first plane P1 indicated in FIG. 1, and thus also substantially perpendicular to a ground surface 32, when the lawnmower 1 is positioned onto a flat ground surface 32 in the intended use position.

As can be seen in FIG. 2, the cutting arrangement 2 comprises a centre body 8 protruding from the top surface 13 of the cutting guard 3. The centre body 8 may be integral to the cutting guard 3 or may be a separate part attached to the cutting guard 3 of the cutting arrangement 2.

Figure 3:
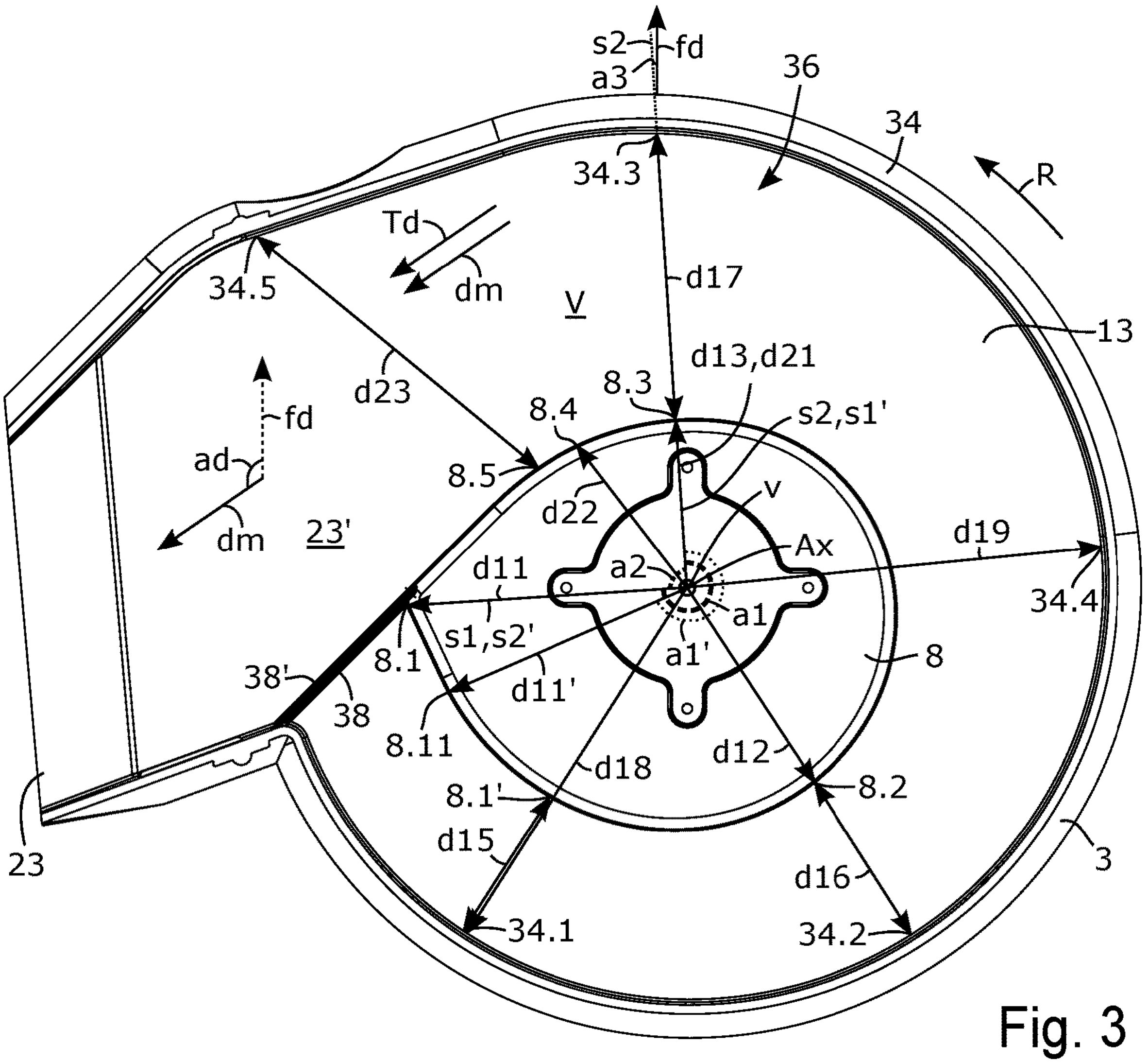
FIG. 3 illustrates an underside of a cutting guard of the lawnmower illustrated in FIG. 1 and FIG. 2.

FIG. 3 illustrates the underside of the cutting guard 3 of the lawnmower 1 illustrated in FIG. 1 and FIG. 2. In FIG. 3, the cutting unit has been removed for reasons of visibility and understanding of the working principle of the cutting arrangement according to embodiments herein. As can be clearly seen in FIG. 3, the centre body 8 has a non-circular shape. The non-circular shape of the centre body 8 facilitates the generation of airflow and negative pressure inside the cutting guard 3, as is further explained herein. Moreover, as can be seen in FIG. 3, the form of the cutting guard 3 resembles the form of a volute of a radial fan, which also facilitates the generation of airflow and negative pressure inside the cutting guard 3, as is further explained herein.

Figure 4:
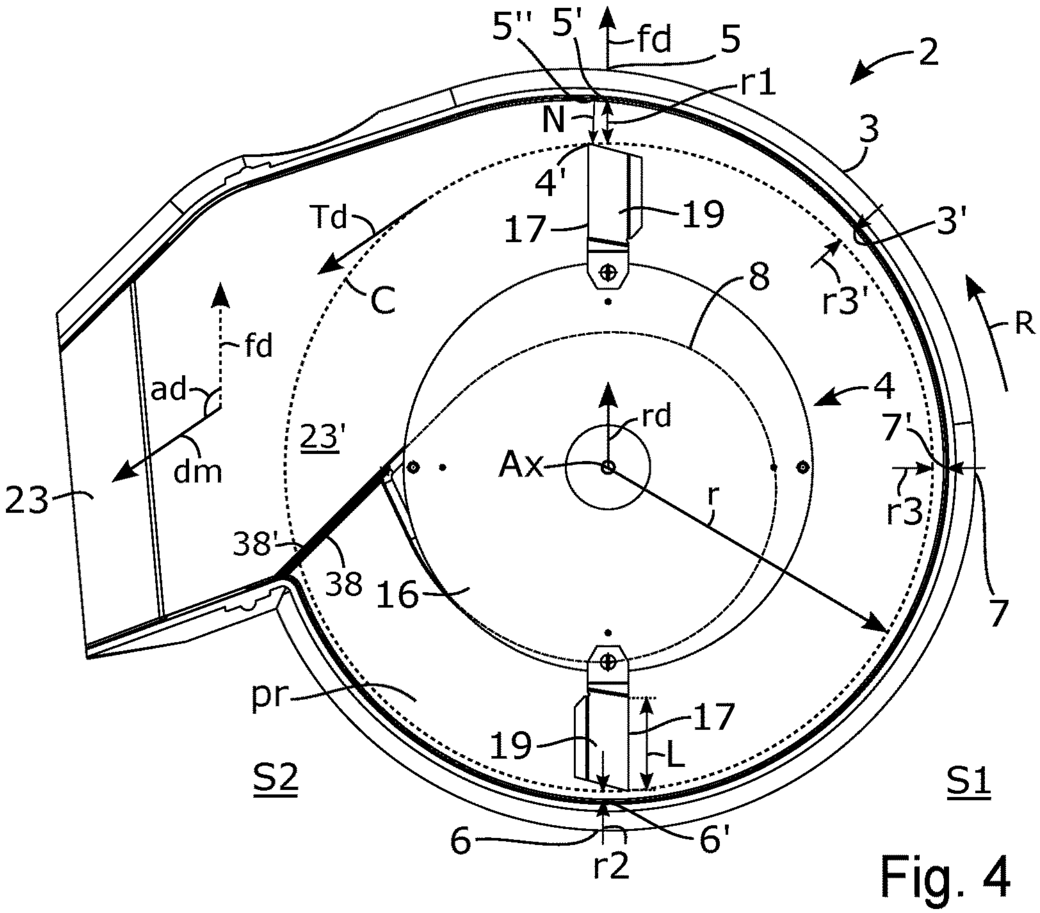
FIG. 4 illustrates an underside of a cutting arrangement of the lawnmower illustrated in FIG. 1 and FIG. 2.

FIG. 4 illustrates the underside of the cutting arrangement 2 of the lawnmower 1 illustrated in FIG. 1 and FIG. 2. The cutting unit 4 is configured to rotate in a first rotational direction R around a rotation axis Ax during operation of the cutting unit 4. The rotation axis Ax and the first rotational direction R are also indicated in FIG. 3. In FIG. 3 and FIG. 4, the cutting guard 3 is illustrated in a viewing direction coinciding with the rotation axis Ax.

As can be seen in FIG. 3 and FIG. 4, the rotation axis Ax of the cutting unit 4 extends through the centre body 8. Moreover, the centre body 8 may comprise at least a portion of a motor configured to rotate the cutting unit 4 in the first rotational direction R around the rotation axis Ax, such as the motor 31 indicated in FIG. 1. In other words, in such embodiments, the motor 31 may fully or partially extend into the centre body 8 of the cutting arrangement 2. In FIG. 4, the portion of the centre body 8 hidden behind the cutting unit 4 is illustrated in a dashed line.

Moreover, a rotation plane pr of the cutting unit 4 is indicated in FIG. 4. The rotation plane pr of the cutting unit 4 is perpendicular to the rotation axis Ax and may also be referred to as a cutting plane of the cutting unit 4. Thus, in FIG. 4, the cutting arrangement 2 is illustrated in a viewing direction perpendicular the rotation plane pr of the cutting unit 4. Below, simultaneous reference is made to FIG. 1-FIG. 4, if not indicated otherwise.

The cutting arrangement 2 is configured such that the rotation plane pr of the cutting unit 4 is substantially parallel to a ground surface 32, and thus also to the first plane P1 referred to above, when a lawnmower 1 comprising the cutting arrangement 2 is positioned in an intended upright use position on a flat ground surface 32. The feature that the rotation plane pr of the cutting unit 4 is substantially parallel to a ground surface 32, and thus also to the first plane P1, may encompass that the angle between the rotation plane pr and the ground surface 32 is less than 15 degrees, or less than 10 degrees when a lawnmower 1 comprising the cutting arrangement 2 is positioned in an intended upright use position on a flat ground surface 32. Likewise, the feature that the rotation plane pr of the cutting unit 4 is substantially parallel to the first plane P1, may encompass that the angle between the rotation plane pr and the first plane P1 is less than 15 degrees, or less than 10 degrees.

Thus, as understood from the above, according to the illustrated embodiments, the rotation axis Ax is substantially perpendicular to the first plane P1 and thus also substantially perpendicular to a ground surface 32 when the lawnmower 1 is positioned onto a flat ground surface 32 in the intended use position. According to some embodiments, the angle between the rotation axis Ax and the first plane P1 may be within the range of 82 degrees-98 degrees or may be within the range of 85 degrees-95 degrees.

As is indicated in FIG. 3, the centre body 8 is arranged such that the distance d11, d12, d13 from the rotation axis Ax to radially outer delimiting surfaces 8.1, 8.2, 8.3 of the centre body 8 decreases continuously, seen in the first rotational direction R, within a first angle a1 having its vertex v at the rotation axis Ax, and wherein the first angle a1 exceeds 90 degrees, or exceeds 180 degrees. Thereby, a cutting arrangement 2 is provided having conditions for generating airflow and a negative pressure inside the cutting guard 3 in an energy efficient manner to lift grass towards the cutting unit 4.

This is because the decreasing radius of the centre body 8 in the rotational direction R of the cutting unit 4 can improve the generation of airflow and the generation of negative pressure inside the cutting guard 3 while reducing the rotational resistance of the cutting unit 4 and hence the energy consumption of the cutting unit 4. In addition, since the cutting arrangement 3 provides conditions for a more efficient generation of airflow and generation of negative pressure inside the cutting guard 3, a cutting arrangement 2 is provided having conditions for an improved cutting result, as is further explained herein.

The feature that the first angle a1 has its vertex v at the rotation axis Ax of the cutting unit 4 means that the first angle a1 is measured at the rotation axis Ax of the cutting unit 4. Moreover, the first angle a1 is measured between a first side s1 thereof and a second side s2 thereof. The first angle a1 may be measured in the rotation plane pr of the cutting unit 4 or in a plane parallel to the rotation plane pr of the cutting unit 4.

According to the illustrated embodiments, the first angle a1 is approximately 271 degrees. According to further embodiments, the first angle a1 may be within one of the following ranges: 90-340 degrees, 180-340 degrees, 90-305 degrees, 180-305 degrees, or 250-290 degrees. In this manner, an efficient generation of airflow and a negative pressure inside the cutting guard 3 can be ensured.

According to the illustrated embodiments, the distance d11 from the rotation axis Ax to a radially outer delimiting surface 8.1 of the centre body 8 at the first side s1 of the first angle a1 is approximately 63% greater, than the distance d13 from the rotation axis Ax to a radially outer delimiting surface 8.3 of the centre body 8 at the second side s2 of the first angle a1. According to further embodiments, the distance d11 from the rotation axis Ax to a radially outer delimiting surface 8.1 of the centre body 8 at the first side s1 of the first angle a1 may be at least 15% greater, or at least 35% greater, than the distance d13 from the rotation axis Ax to a radially outer delimiting surface 8.3 of the centre body 8 at the second side s2 of the first angle a1. Thereby, it can be ensured that the cutting arrangement 2 can generate airflow and a negative pressure inside the cutting guard 3 in an energy efficient manner to efficiently lift grass towards the cutting unit 4, as is further explained herein.

According to the illustrated embodiments, the distance d11 from the rotation axis Ax to a radially outer delimiting surface 8.1 of the centre body 8 at the first side s1 of the first angle a1 is the largest distance d11 from the rotation axis Ax to a radially outer delimiting surface 8.1 of the centre body 8. Likewise, the distance d13 from the rotation axis Ax to a radially outer delimiting surface 8.3 of the centre body 8 at the second side s2 of the first angle a1 is the smallest distance d13 from the rotation axis Ax to a radially outer delimiting surface 8.1 of the centre body 8. Thus, according to the illustrated embodiments, the centre body 8 is arranged such that the largest distance d11 from the rotation axis Ax to a radially outer delimiting surface 8.1 of the centre body 8 is approximately 63% greater than the smallest distance d13 from the rotation axis Ax to a radially outer delimiting surface 8.3 of the centre body 8. According to further embodiments, the centre body 8 may be arranged such that the largest distance d11 from the rotation axis Ax to a radially outer delimiting surface 8.1 of the centre body 8 is at least 30% greater, or at least 40% greater, than the smallest distance d13 from the rotation axis Ax to a radially outer delimiting surface 8.3 of the centre body 8.

According to the illustrated embodiments, the distance d11, d12, d13 from the rotation axis Ax to radially outer delimiting surfaces 8.1, 8.2, 8.3 of the centre body 8 decreases with a substantially constant rate within a large proportion of the first angle a1 as seen in the first rotational direction R. In FIG. 3, a distance d11' is indicated between the rotation axis Ax to a radially outer delimiting surface 8.11 in which the distance d11, d11', d12, d13 from the rotation axis Ax to radially outer delimiting surfaces 8.1, 8.2, 8.3, 8.11 of the centre body 8 starts to decrease with a substantially constant rate as seen in the first rotational direction R. In FIG. 3, an angle a1' is indicated between the second side a2 of the first angle a1 and the radially outer delimiting surface 8.11 in which the distance d11, d11', d12, d13 from the rotation axis Ax to radially outer delimiting surfaces 8.1, 8.2, 8.3, 8.11 of the centre body 8 starts to decrease with a substantially constant rate. The angle a1' and the first angle a1 shares the second side a2. According to the illustrated embodiments, the angle a1' is approximately 252.5 degrees. In other words, according to the illustrated embodiments, the distance d11, d11', d12, d13 from the rotation axis Ax to radially outer delimiting surfaces 8.1, 8.2, 8.3, 8.11 of the centre body 8 decreases with a substantially constant rate as seen in the first rotational direction R within approximately 93.2% of the first angle a1. According to further embodiments, the distance d11, d11', d12, d13 from the rotation axis Ax to radially outer delimiting surfaces 8.1, 8.2, 8.3, 8.11 of the centre body 8 may decrease with a substantially constant rate as seen in the first rotational direction R within approximately 40-100%, or 60-95% of the first angle a1.

The distances d11, d11', d12, d13 from the rotation axis Ax to radially outer delimiting surfaces 8.1, 8.2, 8.3, 8.11 of the centre body 8, as referred to herein, may be measured in the rotation plane pr of the cutting unit 4, or in a plane parallel to the rotation plane pr of the cutting unit 4, in a radial direction rd of the cutting unit 4.

According to the illustrated embodiments, the volume V of a space 36 delimited by radially inner delimiting surfaces 34.1-34.5 of the side walls 34 and radially outer delimiting surfaces 8.1-8.4 of the centre body 8 increases continuously within the first angle a1 seen in the first rotational direction R. Thereby, further efficient aerodynamic properties can be provided inside the cutting guard 3.

Moreover, as is indicated in FIG. 3, according to the illustrated embodiments, the cutting guard 3 is arranged such that the distance d15, d16, d17 between the radially outer delimiting surfaces 8.1', 8.2, 8.3 of the centre body 8 and radially inner delimiting surfaces 34.1, 34.2, 34.3 of the side walls 34 increases continuously within the first angle a1 seen in the first rotational direction R. Thereby, it can be further ensured that the cutting arrangement 2 can generate airflow and a negative pressure inside the cutting guard 3 in an energy efficient manner to efficiently lift grass towards the cutting unit 4. The distance d15, d16, d17 between the radially outer delimiting surfaces 8.1', 8.2, 8.3 of the centre body 8 and radially inner delimiting surfaces 34.1, 34.2, 34.3 of the side walls 34 may be measured in the rotation plane pr of the cutting unit 4, or in a plane parallel to the rotation plane pr of the cutting unit 4, in a radial direction rd of the cutting unit 4.

Furthermore, according to the illustrated embodiments, the cutting guard 3 is arranged such that the distance d18, d19 from the rotation axis Ax to radially inner delimiting surfaces 34.1, 34.4 of the side walls 34 increases continuously within the first angle a1 seen in the first rotational direction R. Thereby, even further efficient aerodynamic properties can be provided inside the cutting guard 3. In this manner, it can be ensured that an airflow and a negative pressure inside the cutting guard 3 can be generated in an efficient manner to lower the energy consumption of the cutting arrangement 2 and improve the cutting result thereof. The distance d18, d19 from the rotation axis Ax to radially inner delimiting surfaces 34.1, 34.4 may be measured in the rotation plane pr of the cutting unit 4, or in a plane parallel to the rotation plane pr of the cutting unit 4, in a radial direction rd of the cutting unit 4.

As can be seen in FIG. 1-FIG. 4, the cutting guard 3 comprises a discharge opening 23. The discharge opening 23 is arranged to eject clippings in a main discharge direction dm from the cutting guard 3. The main discharge direction dm is indicated in FIG. 3 and FIG. 4. The main discharge direction dm is the main direction in which the discharge opening 23 discharges clippings from the cutting guard 3.

As indicated above, the cutting arrangement 2 is configured to be attached to the lawnmower 1 such that a forward direction fd of the cutting arrangement 2 coincides with a forward direction fd' of the lawnmower 1. As can be seen in FIG. 1-FIG. 4, according to the illustrated embodiments, the main discharge direction dm is transversal to the forward direction fd of the cutting arrangement 2. In more detail, according to the illustrated embodiments, the angle ad between the main discharge direction dm and the forward direction fd is approximately 125 degrees. According to further embodiments, the angle ad between the main discharge direction dm and the forward direction fd may be within the range of 30-170 degrees or may be within the range of 70-150 degrees. The angle ad may be measured in the rotation plane pr of the cutting unit 4 or in a plane parallel to the rotation plane pr of the cutting unit 4.

As can be seen in FIG. 2-FIG. 4, the cutting arrangement 2 according to the illustrated embodiments comprises a delimiting wall 38 extending between the centre body 8 and the side walls 34 of the cutting guard 3. The delimiting wall 38 forms a delimiting surface 38' of an outlet portion 23' of the discharge opening 23. Thereby, it can be ensured that clippings are discharged from the cutting guard 3 instead of circulating inside the cutting guard 3 around the rotation axis Ax of the cutting unit 4 upon rotation of the cutting unit 4. In addition, it can be ensured that a negative pressure can be generated inside the cutting guard 3 in an efficient manner to lift grass towards the cutting unit 4.

In FIG. 3, a second angle a2 is indicated. The second angle a2 has its vertex v at the rotation axis Ax of the cutting unit 4. According to the illustrated embodiments, the centre body 8 is arranged such that the distance d21, d22 from the rotation axis Ax to radially outer delimiting surfaces 8.3, 8.4 of the centre body 8 increases, seen in the first rotational direction R, within the second angle a2. Thereby, conditions are provided for generating airflow and a negative pressure inside the cutting guard 3 in an efficient manner, while ensuring that clippings can be discharged from the cutting guard 3 in an efficient manner.

The feature that the second angle a2 has its vertex v at the rotation axis Ax of the cutting unit 4 means that the second angle a2 is measured at the rotation axis Ax of the cutting unit 4. Moreover, the second angle a2 is measured between a first side s1' thereof and a second side s2' thereof. According to the illustrated embodiments, the second side s2 of the first angle a1 constitutes a first side s1' of the second angle a2. Likewise, the first side s1 of the first angle a1 constitutes a second side s2' of the second angle a2. The second angle a2 may be measured in the rotation plane pr of the cutting unit 4 or in a plane parallel to the rotation plane pr of the cutting unit 4.

According to the illustrated embodiments, the second angle a2 is approximately 89 degrees. According to further embodiments, the second angle a2 may be within one of the following ranges: 10-270 degrees, 20-180 degrees, 55-270 degrees, 55-180 degrees, or 70-110 degrees. Thus, as understood from the above described, according to the illustrated embodiments, the sum of the first and second angles a1, a2 is approximately 360 degrees. According to further embodiments, the sum of the first and second angles a1, a2 may be within the range of 320-360 degrees.

According to the illustrated embodiments, the volume V of a space 36 delimited by radially inner delimiting surfaces 34.3, 34.5 of the side walls 34 and the radially outer delimiting surfaces 8.3, 8.4, 8.5 of the centre body 8 increases within the second angle a2 seen in the first rotational direction R. Thereby, conditions are provided for generating airflow and a negative pressure inside the cutting guard 3 in a further efficient manner, while ensuring that clippings can be discharged from the cutting guard 3 in an efficient manner.

In FIG. 3 and FIG. 4, a tangential moving direction Td of the cutting unit 4 is indicated. The tangential moving direction Td of the cutting unit 4 is perpendicular to a radial direction rd of the cutting unit 4 and is a direction in which a portion of the cutting unit 4 moves upon rotation of the cutting unit 4 in the first rotational direction R. As can be seen in FIG. 3 and FIG. 4, according to the illustrated embodiments, the tangential moving direction Td of the cutting unit 4 coincides with the main discharge direction dm at a location within the second angle a2 upon rotation of the cutting unit 4 in the first rotational direction R. Thereby, conditions are provided for an efficient discharge of clippings from the cutting guard 3 via the discharge opening 23.

According to the illustrated embodiments, an angle a3 between the forward direction fd of the cutting arrangement and the second side s2 of the first angle a1 is approximately 3 degrees. Moreover, as indicated above, according to the illustrated embodiments, the second side s2 of the first angle a1 constitutes a first side s1' of the second angle a2. Thereby, a smooth transition is provided between the area of the centre body 8 in which the distance d12 from the rotation axis Ax to radially outer delimiting surfaces 8.2 of the centre body 8 decreases and the area of the centre body 8 in which the distance d22 from the rotation axis Ax to radially outer delimiting surfaces 8.4 of the centre body 8 increases as seen in the first rotational directing R.

The feature that the angle a3 between the forward direction fd of the cutting arrangement 2 and the second side s2 of the first angle a1 is approximately 3 degrees means that the second side s2 of the first angle a1 substantially coincides with the forward direction fd of the cutting arrangement 2. In other words, according to the illustrated embodiments, the centre body 8 is arranged such that the area thereof in which the distance d21 from the rotation axis Ax to a radially outer delimiting surfaces 8.3 of the centre body 8 at which the distance d21 transitions from a decreasing distance d21 to an increasing distance d21, as seen in the first rotational directing R, is positioned to face substantially in the forward direction fd of the cutting arrangement 2. According to further embodiments, the angle a3 between the forward direction fd of the cutting arrangement and the second side s2 of the first angle a1 may be less than 40 degrees or may be less than 20 degrees. The angle a3 between the forward direction fd of the cutting arrangement and the second side s2 of the first angle a1 may also be referred to as a third angle a3.

Figure 5:
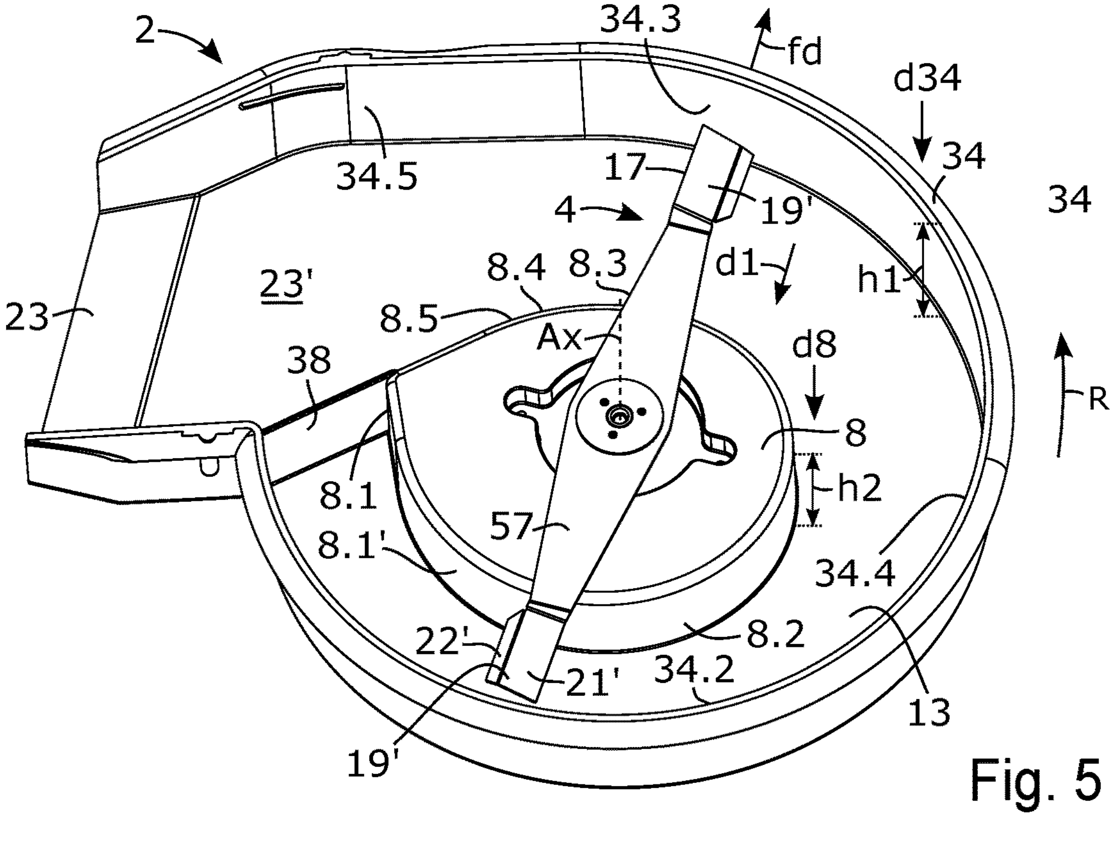
FIG. 5 illustrates a perspective view of a cutting arrangement according to some further embodiments.

FIG. 5 illustrates a perspective view of a cutting arrangement 2 according to some further embodiments. The cutting arrangement 2 illustrated in FIG. 5 comprises the same features, functions, and advantages as the cutting arrangement 2 explained with reference to FIG. 1-FIG. 4, with some differences explained below.

According to the embodiments illustrated in FIG. 5, the cutting arrangement 2 comprises a cutting unit 4 comprising a fix arm arrangement 57 instead of a hub and a number of cutting members pivotally attached to the hub. Instead, the cutting arrangement 2 comprises a number of cutting sections 19' rigidly attached to a respective arm of the fix arm arrangement 57. According to the embodiments illustrated in FIG. 5, the cutting unit 4 comprises two cutting sections 19' rigidly attached to a respective arm of the fix arm arrangement 57. Each cutting section 19' may have identical form, features, functions and advantages as the form, features, functions and advantages of the cutting members 19 of the cutting arrangement 2 explained with reference to FIG. 1-FIG. 4, except the pivoting feature of the cutting members 19 explained with reference to FIG. 2.

Moreover, the cutting arrangement 2 illustrated in FIG. 5 comprises a cutting guard 3 according to the embodiments explained with reference to FIG. 2-FIG. 4. That is, according to the illustrated embodiments, the cutting arrangement 2 illustrated in FIG. 5 comprises a cutting guard 3 being identical to the cutting guard 3 explained with reference to FIG. 2-FIG. 4. Below, simultaneous reference is made to FIG. 1-FIG. 5, if not indicated otherwise.

In FIG. 5, radially outer delimiting surfaces 8.1-8.5 of the centre body 8 and radially inner delimiting surfaces 34.1-34.5 of the side walls 34 are indicated. As is best seen in FIG. 5, the radially outer delimiting surfaces 8.1-8.5 of the centre body 8 extends in directions d8 substantially parallel to the rotation axis Ax of the cutting unit 4. Likewise, the radially inner delimiting surfaces 34.1-34.5 of the side walls 34 extend in directions d34 substantially parallel to the rotation axis Ax of the cutting unit 4. The wording "substantially parallel to", as used herein, may encompass that the angle between the objects referred to is less than 10 degrees, or is less than 7 degrees.

According to the illustrated embodiments, the height h2 of the radially outer delimiting surfaces 8.1-8.5 of the centre body 8 is approximately 74% of the height h1 of the radially inner delimiting surfaces 34.1-34.5 of the side walls 34. According to further embodiments, the height h2 of the radially outer delimiting surfaces 8.1-8.5 of the centre body 8 may be at least 20%, or may be at least 50%, of the height h1 of the radially inner delimiting surfaces 34.1-34.5 of the side walls 34. Moreover, according to the illustrated embodiments, the top surface 13 of the cutting guard 3 is substantially flat and faces the first plane P1 and thus also faces a ground surface 32 when the lawnmower 1 is positioned onto a flat ground surface 32 in an intended use position. Moreover, according to the illustrated embodiments, the top surface 13 of the cutting guard 3 is substantially parallel to the first plane P1 and thus also to a ground surface 32 when the lawnmower 1 is positioned onto a flat ground surface 32 in the intended use position. Thus, according to the illustrated embodiments, the radially outer delimiting surfaces 8.1-8.5 of the centre body 8 are substantially perpendicular to the top surface 13 of the cutting guard 3. Likewise, according to the illustrated embodiments, the radially inner delimiting surfaces 34.1-34.5 of the side walls 34 are substantially perpendicular to the top surface 13 of the cutting guard 3.

The height h1 of the radially inner delimiting surfaces 34.1-34.5 of the side walls 34 may be measured in directions parallel to the rotation axis Ax of the cutting unit 4. Likewise, the height h2 of the radially outer delimiting surfaces 8.1-8.5 of the centre body 8 may be measured in directions parallel to the rotation axis Ax of the cutting unit 4. According to the illustrated embodiments, the height h1 of the radially inner delimiting surfaces 34.1-34.5 of the side walls 34 is approximately 25% of the radius of the cutting unit 4. According to further embodiments, the height h1 of the radially inner delimiting surfaces 34.1-34.5 of the side walls 34 may be within the range of 7%-40%, or may be within the range of 15%-35%, of the radius of the cutting unit 4.

According to the illustrated embodiments, the cutting unit 4 comprises one or more surfaces 21', 22' being angled relative to a rotation plane Pr of the cutting unit 4 to generate an airflow in a direction d1 transverse to the rotation plane Pr during rotation of the cutting unit 4 in the first rotational direction R. In more detail, according to the illustrated embodiments, the surfaces 21', 22' are angled relative to the rotation plane Pr to generate an airflow in a direction d1 towards the top surface 13 of the cutting guard 3 during rotation of the cutting unit 4 in the first rotational direction R.

Figure 6:
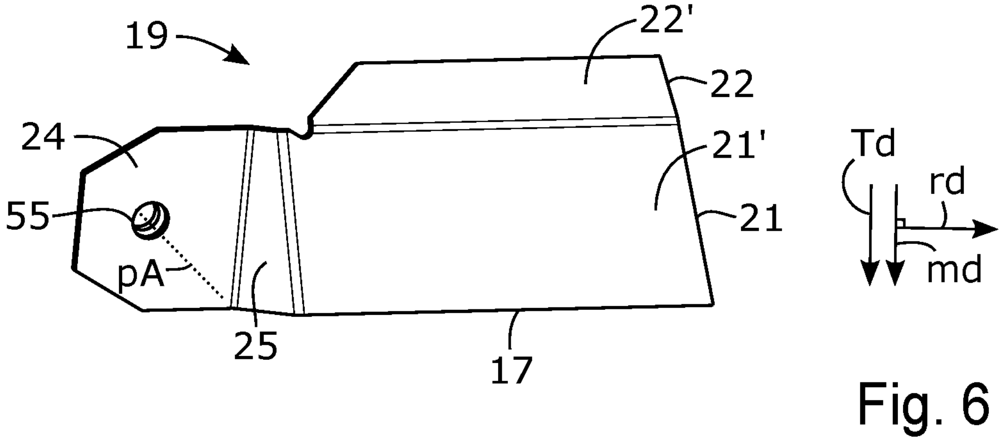
FIG. 6 illustrates a perspective view of a cutting member of a cutting unit according to the embodiments illustrated in FIG. 1-FIG. 4.

FIG. 6 illustrates a perspective view of a cutting member 19 of the cutting unit 4 according to the embodiments illustrated in FIG. 1-FIG. 4. Below, simultaneous reference is made to FIG. 1-FIG. 6, if not indicated otherwise. The cutting member 19 comprises an attachment section 24. The cutting member 19 is configured to be pivotally attached to a hub 16 of the cutting unit 4 around the pivot axis pA. According to the illustrated embodiments, the attachment section 24 comprises a through hole 55. According to the illustrated embodiments, the cutting member 19 is configured to be pivotally attached to the hub 16 by a fastening element extending through the through hole 55.

The cutting member 19 further comprises a first and a second section 21, 22 comprising a first and a second surface 21', 22' respectively. That is, the first section 21 of the cutting member 19 comprises the first surface 21' and the second section 22 of the cutting member 19 comprises the second surface 22'. Each of the first and a second surfaces 21', 22' is angled relative to the rotation plane Pr of the cutting unit 4 to generate an airflow in a direction d1 transverse to the rotation plane Pr during rotation of the cutting arrangement 2.

Figure 7:
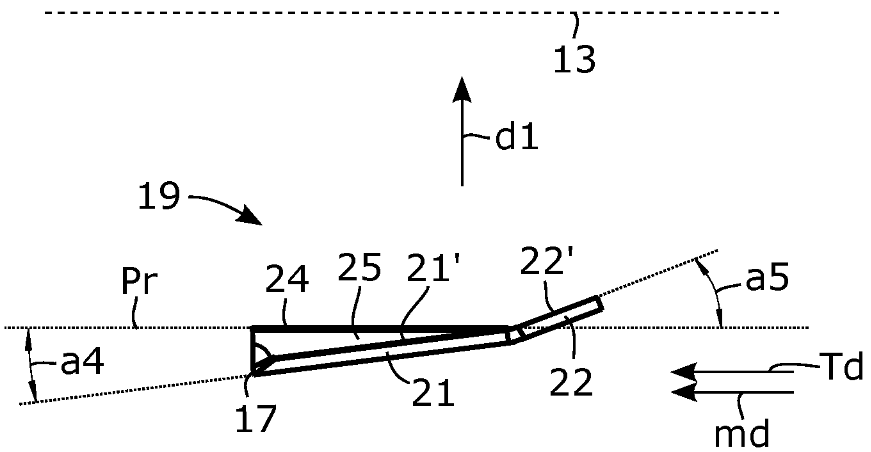
FIG. 7 illustrates a side view of the cutting member illustrated in FIG. 6.

FIG. 7 illustrates a side view of the cutting member 19 illustrated in FIG. 6. Below, simultaneous reference is made to FIG. 1-FIG. 7, if not indicated otherwise. In FIG. 6 and FIG. 7, a moving direction md of the cutting member 19 is indicated. The cutting member 19 moves in the moving direction md upon rotation of the cutting unit 4 in the first rotational direction R indicated in FIG. 3 and FIG. 4. Obviously, the moving direction md is parallel to the rotation plane Pr of the cutting unit 4 and is perpendicular to a radial direction rd of the cutting unit 4. Moreover, the moving direction md of the cutting unit 4 is parallel to a tangential direction Td of the cutting unit 4. Furthermore, in FIG. 7, the top surface 13 of the cutting guard 3 is schematically indicated.

As best seen in FIG. 6 and FIG. 7, according to the illustrated embodiments, the second surface 22' is arranged behind the first surface 21' seen along the moving direction md of the surfaces 21', 22' upon rotation of the cutting unit 4 in the first rotational direction R. In other words, the second surface 22' is arranged at a trailing edge of the first surface 21' seen along the moving direction md of the surfaces 21', 22' upon rotation of the cutting unit 4 in the first rotational direction R. Moreover, as indicated in FIG. 7, the first surface 21' is angled at a fourth angle a4 relative to the rotation plane Pr and the second surface 22' is angled at a fifth angle a5 relative to the rotation plane Pr, and wherein the fifth angle a5 is greater than the fourth angle a4.

Moreover, according to the illustrated embodiments, each of the first and second surfaces 21', 22' is angled to generate airflow towards the top surface 13 of the gutting guard 3 upon rotation of the cutting unit 4 in the first rotational direction R. Due to these features, efficient aerodynamic properties of the cutting member 19 is provided to efficiently generate a negative pressure inside the cutting guard 3 while avoiding a high rotational resistance of the cutting unit 4. Accordingly, due to these features, an even more efficient cutting arrangement 2 is provided.

According to the illustrated embodiments, the fourth angle a4 is approximately 5 degrees and the fifth angle a5 is approximately 20 degrees. Thus, according to the illustrated embodiments, the angle between the first and second surfaces 21', 22' is approximately 15 degrees. According to further embodiments, the fourth angle a4 may be within the range of 0-12 degrees or may be within the range of 2-7 degrees, and the fifth angle a5 may be within the range of 12-38 degrees or may be within the range of 17-23 degrees. In this manner, a negative pressure inside the cutting guard 3 can be generated in an efficient manner while avoiding a high rotational resistance of the cutting unit 4.

The cutting member 19 comprises a sharp leading edge 17, i.e. a sharp edge at a front section of the cutting member 19 seen in the moving direction md of the cutting member 19. The sharp leading edges 17 of the cutting members are also indicated in FIG. 4. Likewise, a sharp leading edge 17 of the cutting unit 4 is also indicated in FIG. 5. As seen in FIG. 6 and FIG. 7, the first and second surfaces 21', 22' are each separate from each of the number of sharp leading edges 17. Moreover, according to the illustrated embodiments, the first section 21 of the cutting member 19 comprises the sharp leading edge 17, wherein the sharp leading edge 17 is arranged adjacent to the first surface 21'. The sharp leading edge 17 is configured to cut vegetation upon rotation of the cutting unit 4.

As best seen in FIG. 7, according to the illustrated embodiments, the attachment section 24 of the cutting member 19 is parallel to the rotation plane Pr. Moreover, the cutting member 19 comprises a connecting section 25 connecting the first section 21 to the attachment section 24. The second section 22 is attached to the attachment section 24 via the first section 21. As can be seen in FIG. 6 and FIG. 7, according to the illustrated embodiments, the connecting section 25 is angled relative to the rotation plane Pr and relative to a radial direction rd of the cutting unit 4.

Moreover, according to the illustrated embodiments, the first section 21, the second section 22, the attachment section 24, and the connecting section 25 are formed by bending of one piece of a sheet metal material. Moreover, each of the first section 21, the second section 22, the attachment section 24, and the connecting section 25 is substantially planar. Thus, according to the illustrated embodiments, each of the first and second surfaces 21', 22' is substantially planar. Due to these features, a cutting member 19 is provided having conditions for cutting vegetation in an efficient manner while having conditions and characteristics suitable for being manufactured and assembled in a cost-efficient manner.

Even though the cutting member 19 according to the illustrated embodiments comprises two surfaces 21', 22' having different angles relative to the rotation plane Pr of the cutting unit 4, the cutting members 19 of the cutting unit 4 may comprise only one surface angled relative to the rotation plane Pr of the cutting unit. According to such embodiments, the angle between such a surface and the rotation plane pr of the cutting unit 4 may be within one of the herein given ranges for the fourth and fifth angles a4, a5.

As indicated above, each cutting section 19' of the cutting unit 4 according to the embodiments illustrated in FIG. 5 may have identical form, features, functions and advantages as the form, features, functions, and advantages of the cutting members 19 of the cutting arrangement 2 explained with reference to FIG. 6 and FIG. 7, except the pivoting feature of the cutting members 19 explained with reference to FIG. 2, FIG. 6 and FIG. 7. That is, each cutting section 19' of the cutting unit 4 according to the embodiments illustrated in FIG. 5 may comprise a first surface 21' and a second surface 22' as explained with reference to FIG. 6 and FIG. 7.

As is indicated in FIG. 4, the cutting unit 4 is configured to rotate such that one or more radially outer portions 4' of the cutting unit 4 orbits in a circular path C inside the cutting guard 3. As understood from the above described, the circular path C extends in the rotation plane pr of the cutting unit 4. The circular path C, as referred to herein, is a geometric shape which can be obtained by tracing the circular movement of one or more radially outer portions 4' of the cutting unit 4 upon rotation of the cutting unit 4 inside the cutting guard 3.

As indicated in FIG. 4, the cutting guard 3 comprises a front section 5 and a rear section 6, seen relative to the forward direction fd of the cutting arrangement 2. The front section 5 and the rear section 6 together encloses a portion of the cutting unit 4 and also a portion of the circular path C. The front section 5 may be the foremost part of the cutting guard 3 and the rear section 6 may be the rearmost part of the cutting guard 3, seen relative to the forward direction fd of the cutting arrangement 2. During movement of a lawnmower 1 comprising the cutting arrangement 2 in the forward direction fd', grass or other type of vegetation will first reach the front section 5 of the cutting guard 3. The front section 5 of the cutting guard 3 may also be referred to as a leading section of the cutting guard 3 seen relative to the forward direction fd of the cutting arrangement 2 and the rear section 6 of the cutting guard 3 may also be referred to as a trailing section of the cutting guard 3 seen relative to the forward direction fd of the cutting arrangement 2.

As can be clearly seen in FIG. 3, the cutting guard 3 is arranged such that a first radial distance r1 from the circular path C to a radially inner delimiting surface 5' of the front section 5 of the cutting guard 3 is greater than a second radial distance r2 from the circular path C to a radially inner delimiting surfaces 6' of the rear section 6 of the cutting guard 3. The first radial distance r1, as referred to herein, may be defined as the distance from the circular path C to an inner surface 5' of the front section 5 of the cutting guard 3 measured in a radial direction rd of the circular path C. Likewise, the second radial distance r2, as referred to herein, may be defined as the distance from the circular path C to a radially inner delimiting surfaces 6' of the rear section 6 of the cutting guard 3 measured in a radial direction rd of the circular path C.

As understood from the herein described, the radial direction rd of the circular path C is perpendicular to the rotation axis Ax of the cutting unit 4 and extends in the rotation plane pr of the cutting unit 4. Moreover, the radial direction rd of the circular path C coincides with a radial direction rd of the cutting unit 4. Furthermore, according to the illustrated embodiments, the radial direction rd of the cutting unit 4 coincides with a radial direction rd of the cutting guard 3.

In addition, as understood from the above described, the first radial distance r1 can be obtained by subtracting the radius r of the circular path C from the distance between the rotation axis Ax of the cutting unit 4 and the inner surface 5' of the front section 5 of the cutting guard 3. Likewise, the second radial distance r2 can be obtained by subtracting the radius r of the circular path C from the distance between the rotation axis Ax of the cutting unit 4 and the inner surface 6' of the rear section 6 of the cutting guard 3. The radius r of the circular path C can also be referred to the radius r of the cutting unit 4, also referred to above, measured from the rotation axis Ax of the cutting unit 4 to a radially outer portion 4' of the cutting unit 4.

According to the illustrated embodiments, the first radial distance r1 is approximately five times larger than the second radial distance r2. In other words, according to the illustrated embodiments, the first radial distance r1 is approximately 500% of the second radial distance r2. According to further embodiments, the first radial distance r1 may be within the range of 150%-1300% of the second radial distance r2 or may be within the range of 350%-900% of the second radial distance r2.

Since the first radial distance r1 is greater than the second radial distance r2, a cutting arrangement 2 is provided having conditions for cutting grass in an energy efficient manner while having conditions for obtaining an improved cutting result. The cutting result can be improved because grass is allowed to raise to an upright straight position by its own stiffness after having been bent by the front section 5 of the cutting guard 3 during movement of the cutting guard 3 in the forward direction fd over a lawn. That is, when the cutting arrangement 2 is moved in the forward direction fd indicated in FIG. 4 over a lawn, i.e. upwards in FIG. 4, the front section 5 of the cutting guard 3 will bend grass. Studies have shown that the bending of the grass caused by a front section of a cutting guard impairs the cutting result because a large proportion of the grass do not have time to raise to an upright straight position by its own stiffness to reach the cutting unit during cutting. However, due to the relatively large distance r1 from the inner surface 5' of the front section 5 and radially outer portions 4' of the cutting arrangement 2, grass is allowed to raise to an upright straight position by its own stiffness after having been bent by the front section 5 to reach the cutting unit 4. In this manner, the cutting result can be improved.

Moreover, the need for forming a large negative pressure inside the cutting guard 3 is circumvented, or at least reduced, which provides conditions for operating the cutting arrangement 2 in an energy efficient manner. In addition, the greater distance from the front section 5 of the cutting guard 3 to the circular path C can reduce the negative pressure inside the cutting guard 3 which in turn can reduce the rotational resistance of the cutting unit 4 and hence the energy consumption of the cutting arrangement 2.

Thus, due to the features of the cutting arrangement 2, the energy consumption of a lawnmower 1 comprising the cutting arrangement 2 can be lowered and the cutting result can be improved. In addition, the cutting arrangement 2 provides conditions for increasing available operational time of a lawnmower comprising the cutting arrangement 2 before an energy storing unit of the lawnmower has to be charged or refilled. As a further result thereof, the cutting arrangement 2 provides conditions for operating the lawnmower 1 comprising the cutting arrangement 2 in a more cost-efficient manner.

Moreover, as understood from the above, due to the relatively large distance r1 from the inner surface 5' of the front section 5 and radially outer portions 4' of the cutting arrangement 2, the surfaces 21', 22' of the cutting members 19 can be provided with relatively small angles relative to the rotation plane Pr of the cutting unit 4 while ensuring a satisfactory cutting result. By using relatively small angles between the one or more surfaces 21', 22' and the rotation plane pr, a low rotational resistance of the cutting unit 4 and hence a low energy consumption of the cutting unit 4 is provided.

Moreover, small angles between the one or more surfaces 21', 22' and the rotation plane pr lower air flow in unwanted directions which in turn reduces the rotational resistance of the cutting unit 4 and hence the energy consumption of the cutting arrangement 2. In addition, as understood from the above described, since the cutting arrangement 2 can ensure that grass can have time to raise to an upright straight position by its own stiffness, a satisfactory cutting result can be obtained despite a lower negative pressure inside the cutting guard 3 caused by the relatively small angle between the one or more surfaces 22' and the rotation plane pr of the cutting unit 4.

As indicated in FIG. 4, according to the illustrated embodiments, the portion 5" of the front section 5 located radially outside of the circular path C comprises a surface normal N substantially parallel to a rotation plane Pr of the cutting unit 4. Thereby, a safe and reliable cutting guard 3 is provided. As an example, objects thrown from the cutting unit 4 towards the cutting guard 3 can bounce of the cutting guard 3 in safe directions. Moreover, airflow and a negative pressure inside the cutting guard 3 can be generated in an efficient manner.

As mentioned above, according to the embodiments illustrated in FIG. 1-FIG. 4, the cutting unit 4 comprises a hub 16 and a number of cutting members 19 pivotally attached at a periphery of the hub 16. According to the embodiments illustrated in FIG. 1-FIG. 4, the cutting unit 4 comprises two cutting members 19 pivotally attached at a periphery of the hub 16. According to further embodiments, the cutting unit 4 may comprise another number of cutting members 19, such as one, three, four, five, or the like.

According to some embodiments, the cutting unit 4 may comprise at least two cutting members 19 arranged at different distances from a rotation axis Ax of the cutting unit 4. Thereby, a cutting arrangement 2 is provided having conditions for cutting vegetation in a further efficient manner. This is because the at least two cutting members 19 will cut vegetation at different radiuses from the rotation axis Ax of the cutting unit 4.

As indicated in FIG. 4, the cutting guard 3 comprises a side section 7. The side section 7 encloses a portion of the circular path C. In more detail, according to the illustrated embodiments, the front section 5, the side section 7, and the rear section 6 together enclose approximately 75% of the circumference of the circular path C. The side section 7 is arranged at a first side S1 of the cutting guard 3 and the discharge opening 23 is arranged at a second side S2 of the cutting guard 3. The second side S2 of the cutting guard 3 is opposite to the first side S1 of the cutting guard 3.

In FIG. 4, a third radial distance r3 from the circular path C to an inner surface 7' of the side section 7 is indicated. The third radial distance r3 as referred to herein may be defined as the distance from the circular path C to the inner surface 7' of the side section 7 of the cutting guard 3 measured in a radial direction rd of the circular path C. In addition, as understood from the above described, the third radial distance r3 can be obtained by subtracting the radius r of the circular path C from the distance between the rotation axis Ax of the cutting unit 4 and inner surface 7' of the side section 7 of the cutting guard 3.

As can be seen in FIG. 4, the first radial distance r1 is greater than the third radial distance r3. Moreover, the third radial distance r3 is greater than the second radial distance r2. Thereby, conditions are provided for forming a negative pressure inside the cutting guard 3 using a low amount of energy while ensuring that at least a larger proportion of the grass can have time to raise to an upright straight position by its own stiffness after having been bent by the front section 5 of the cutting guard 3. A negative pressure inside the cutting guard 3 can be formed using a low amount of energy because of the relatively smaller distance r2 between the circular path C and the inner surface 6' of the rear section 6 as compared to the distance between the circular path C and the inner surface 7' of the side section 7 of the cutting guard 3.

Moreover, as can be seen in FIG. 4, the radial distance r3, r3', r1 from the circular path C to an inner surface 7', 3', 5' of cutting guard 3 increases continuously from the side section 7 of the cutting guard 3 towards the front section 5 of the cutting guard 3. In addition, according to the illustrated embodiments, the radial distance r2, r3, from the circular path C to an inner surface 6', 7' of cutting guard 3 increases continuously from the rear section 6 of the cutting guard 3 towards the side section 7 of the cutting guard 3. Due to these features, conditions are provided for forming a negative pressure inside the cutting guard 3 using a low amount of energy while ensuring that at least a larger proportion of the grass can have time to raise to an upright straight position by its own stiffness after having been bent by the front section 5 of the cutting guard 3 during movement of the cutting guard 3 in the forward direction fd. Moreover, conditions are provided for obtaining advantageous aerodynamical properties inside the cutting guard 3 which can reduce the rotational resistance of the cutting unit 4 and hence the energy consumption of the cutting unit 4.

According to the illustrated embodiments, the radius r of the circular path C is 200 mm. According to further embodiments, the radius r of the circular path C may be within the range of 50-400 mm or within the range of 150-250 mm. Moreover, according to the illustrated embodiments, the length L of the cutting edges 17 of the cutting unit 4 is approximately 58 mm. According to further embodiments, the length L of the cutting edges 17 may be within the range of 20-80 mm, or within the range of 35-65 mm. Moreover, the length L of the cutting edges 17 may be within the range of 12%-50% of the radius r of the circular path C or may be within the range of 17%-33% of the radius r of the circular path C.

Moreover, according to the illustrated embodiments, the first radial distance r1 is approximately 35 mm. According to further embodiments, the first radial distance r1 may be within the range of 15-80 mm, or may be within the range of 25-45 mm. Furthermore, according to the illustrated embodiments, the second radial distance r2 is approximately 7 mm. According to further embodiments, the second radial distance r2 may be within the range of 2-14 mm, or may be within the range of 4-9 mm. Moreover, according to the illustrated embodiments, the third radial distance r3 is approximately 10 mm. According to further embodiments, the second radial distance r2 may be within the range of 5-20 mm, or may be within the range of 7-13 mm.

According to the illustrated embodiments, the motor 31 is configured to rotate the cutting unit 4 in the first rotational direction R during operation of the lawnmower 1 at a rotational speed causing the one or more radially outer portions 4' of the cutting unit 4 to orbit at a velocity of approximately 70 metres per second. According to further embodiments, the motor 31 may be configured to rotate the cutting unit 4 during operation of the lawnmower 1 at a rotational speed causing the one or more radially outer portions 4' of the cutting unit 4 to orbit at a velocity within the range of 60-80 metres per second, or within the range of 65-75 metres per second.

Tests have shown that the cutting arrangement 2 according to the illustrated embodiments is able to reduce the energy needed for cutting with approximately 50% while ensuring a satisfactory cutting result. As explained herein, this is at least partly obtained by the combination of the shape of the cutting guard 3, the shape of the centre body 8, the relatively large distance r1 from the inner surface 5' of the front section 5 and radially outer portions 4' of the cutting arrangement 2 and the fact that the surfaces 21', 22' for generating airflow can be provided with relatively small angles relative to the rotation plane Pr of the cutting unit 4.

The wording "first rotational direction R" is used herein for reasons of brevity and clarity for describing the intended rotational direction R of the cutting unit 4. A second rotational direction is not mentioned or indicated in the figures but is a rotational direction opposite to the first rotational direction R. The "first rotational direction R", referred to herein, may also be referred to as an intended rotational direction of the cutting unit 4.

As indicated above, the distances d11, d11', d12, d13, d22 from the rotation axis Ax to radially outer delimiting surfaces 8.1, 8.2, 8.3, 8.4, 8.11 of the centre body 8, as referred to herein, may be measured in the rotation plane pr of the cutting unit 4, or in a plane parallel to the rotation plane pr of the cutting unit 4. Since the distances d11, d11', d12, d13, d22 are measured from the rotation axis Ax to radially outer delimiting surfaces 8.1, 8.2, 8.3, 8.4, 8.11 of the centre body 8, the distances d11, d11', d12, d13, d22 may be measured in a radial direction rd of the cutting unit 4. Therefore, the distances d11, d11', d12, d13, d22 from the rotation axis Ax to radially outer delimiting surfaces 8.1, 8.2, 8.3, 8.4, 8.11 of the centre body 8, as referred to herein, may also be referred to as radial distances 8.1, 8.2, 8.3, 8.4, 8.11.

Likewise, as indicated above, the distance d18, d19 from the rotation axis Ax to radially inner delimiting surfaces 34.1, 34.4 may be measured in the rotation plane pr of the cutting unit 4, or in a plane parallel to the rotation plane pr of the cutting unit 4. Since the distance d18, d19 is measured from the rotation axis Ax to radially inner delimiting surfaces 34.1, 34.4, the distance d18, d19 may be measured in a radial direction rd of the cutting guard 3. Therefore, the distance d18, d19 from the rotation axis Ax to radially inner delimiting surfaces 34.1, 34.4, as referred to therein, may also be referred to as a radial distance d18, d19.

Moreover, as indicated above, the distance d15, d16, d17 between the radially outer delimiting surfaces 8.1', 8.2, 8.3 of the centre body 8 and radially inner delimiting surfaces 34.1, 34.2, 34.3 of the side walls 34 may be measured in a radial direction rd of the cutting unit 4. Therefore, the distance d15, d16, d17 between the radially outer delimiting surfaces 8.1', 8.2, 8.3 of the centre body 8 and radially inner delimiting surfaces 34.1, 34.2, 34.3 of the side walls 34, as referred to therein, may also be referred to as a radial distance d15, d16, d17.

The above mentioned distances d11, d11', d12, d13, d22, d15, d16, d17, d18, d19 may alternatively be measured in a radial direction rd of the circular path C or in a radial direction rd of the cutting guard 3. Moreover, the above mentioned distances d11, d11', d12, d13, d22, d15, d16, d17, d18, d19 may be measured in a direction extending through the rotation axis Ax of the cutting unit 4 and being perpendicular to the rotation axis Ax of the cutting unit 4.

The first, second, and third radial distances r1, r2, r3, as referred to herein, may also be referred to as a first, second, or third distance r1, r2, r3. The first, second, and third radial distance r1, r2, r3 may be measured in a radial direction rd of the circular path C, in a radial direction rd of the cutting unit 4, and/or in a radial direction rd of the cutting guard 3. Moreover, the first, second, and third radial distances r1, r2, r3, as referred to herein, may also be referred to as a first, second, or third distance r1, r2, r3 measured in a direction extending through the rotation axis Ax of the cutting unit 4 and being perpendicular to the rotation axis Ax of the cutting unit 4.

The wording "substantially parallel to", as used herein, may encompass that the angle between the objects referred to is less than 10 degrees, or is less than 7 degrees The wording "substantially planar", as used herein, may encompass that the object referred to deviates less than 10% from the shape of a flat plane.

The wording "substantially perpendicular to", as used herein, may encompass that the angle between the objects referred to is within the range of 80-100 degrees or is within the range of 83-97 degrees.

It is to be understood that the foregoing is illustrative of various example embodiments and that the invention is defined only by the appended independent claims. A person skilled in the art will realize that the example embodiments may be modified, and that different features of the example embodiments may be combined to create embodiments other than those described herein, without departing from the scope of the present invention, as defined by the appended independent claims.

As used herein, the term "comprising" or "comprises" is open-ended, and includes one or more stated features, elements, steps, components, or functions but does not preclude the presence or addition of one or more other features, elements, steps, components, functions, or groups thereof.

The invention claimed is:

1. A cutting arrangement configured to be attached to a lawnmower to cut vegetation, wherein the cutting arrangement comprises:

a cutting unit configured to rotate in a first rotational direction around a rotation axis during operation, a cutting guard comprising a top surface and side walls, and a centre body protruding from the top surface, wherein the centre body is arranged such that a distance from the rotation axis to radially outer delimiting surfaces of the centre body decreases continuously, seen in a first rotational direction, within a first angle having its vertex at the rotation axis, and wherein the first angle exceeds 90 degrees, further wherein the distance from the rotation axis to a radially outer delimiting surface of the centre body at a first side of the first angle is at least 15% greater than the distance from the rotation axis to a radially outer delimiting surface of the centre body at a second side of the first angle.

2. The cutting arrangement according to claim 1, wherein the distance from the rotation axis to a radially outer delimiting surface of the centre body at a first side of the first angle is at least 35% greater than the distance from the rotation axis to a radially outer delimiting surface of the centre body at a second side of the first angle.

3. The cutting arrangement according to claim 1, wherein the distance from the rotation axis to radially outer delimiting surfaces of the centre body decreases with a substantially constant rate within at least a portion of the first angle.

4. The cutting arrangement according to claim 1, wherein the centre body is arranged such that a largest distance from the rotation axis to a first radially outer delimiting surface of the centre body is at least 30% greater than a smallest distance from the rotation axis to a second radially outer delimiting surface of the centre body.

5. The cutting arrangement according to claim 1, wherein a volume of a space delimited by radially inner delimiting surfaces of the side walls and radially outer delimiting surfaces of the centre body increases continuously within the first angle seen in the first rotational direction.

6. The cutting arrangement according to claim 1, wherein the cutting guard is arranged such that the distance between the radially outer delimiting surfaces of the centre body and radially inner delimiting surfaces of the side walls increases continuously within the first angle seen in the first rotational direction.

7. The cutting arrangement according to claim 1, wherein the cutting guard is arranged such that the distance from the rotation axis to radially inner delimiting surfaces of the side walls increases continuously within the first angle seen in the first rotational direction.

8. The cutting arrangement according to claim 1, wherein the cutting guard comprises a discharge opening arranged to eject clippings in a main discharge direction from the cutting guard.

9. The cutting arrangement according to claim 8, wherein the cutting arrangement is configured to be attached to the lawnmower such that a forward direction of the cutting arrangement coincides with a forward direction of the lawnmower, and wherein a main discharge direction is transversal to the forward direction of the cutting arrangement.

10. The cutting arrangement according to claim 9, wherein an angle between the main discharge direction and the forward direction of the cutting arrangement is within the range of 30-170 degrees.

11. The cutting arrangement according to claim 8, wherein the cutting arrangement comprises a delimiting wall extending between the centre body and the side walls of the cutting guard, and wherein the delimiting wall forms a delimiting surface of an outlet portion of the discharge opening.

12. The cutting arrangement according to claim 8, wherein a tangential moving direction of the cutting unit, upon rotation of the cutting unit in the first rotational direction, coincides with the main discharge direction at a location within the second angle.

13. The cutting arrangement according to claim 1, wherein the centre body is arranged such that the distance from the rotation axis to radially outer delimiting surfaces of the centre body increases, seen in the first rotational direction, within a second angle having its vertex at the rotation axis.

14. The cutting arrangement according to claim 13, wherein a volume of a space delimited by radially inner delimiting surfaces of the side walls and the radially outer delimiting surfaces of the centre body increases within the second angle seen in the first rotational direction.

15. The cutting arrangement according to claim 1, wherein the cutting arrangement is configured to be attached to the lawnmower such that a forward direction of the cutting arrangement coincides with a forward direction of the lawnmower, and wherein an angle between the forward direction of the cutting arrangement and a second side of the first angle is less than 20 degrees.

16. The cutting arrangement according to claim 1, wherein the radially outer delimiting surfaces of the centre body extends in directions substantially parallel to the rotation axis, or wherein radially inner delimiting surfaces of the side walls extend in directions substantially parallel to the rotation axis.

17. The cutting arrangement according to claim 1, wherein a height of the radially outer delimiting surfaces of the centre body is at least 20% of a height of radially inner delimiting surfaces.

18. The cutting arrangement according to claim 1, wherein the cutting unit comprises one or more surfaces being angled relative to a rotation plane of the cutting unit to generate an airflow in a direction transverse to the rotation plane during rotation of the cutting unit in the first rotational direction.

19. The cutting arrangement according to claim 18, wherein the surfaces are angled relative to the rotation plane to generate an airflow in a direction towards the top surface of the cutting guard during rotation of the cutting unit in the first rotational direction.

20. The cutting arrangement according to claim 1, wherein the cutting unit is configured to rotate such that one or more radially outer portions of the cutting unit orbits in a circular path inside the cutting guard, and wherein a first radial distance from the circular path to a radially inner delimiting surface of the front section of the cutting guard is greater than a second radial distance from the circular path to a radially inner delimiting surfaces of the rear section of the cutting guard.

21. A lawnmower comprising the cutting arrangement of claim 1, wherein the lawnmower is a self-propelled robotic lawnmower configured to navigate and cut grass in an area in an autonomous manner.

* * * * *